US 9,195,247 B2

(12) United States Patent
Saito et al.

(10) Patent No.: US 9,195,247 B2
(45) Date of Patent: Nov. 24, 2015

(54) DC-DC CONVERTER

(71) Applicant: Kabushiki Kaisha Toshiba, Tokyo (JP)

(72) Inventors: Hiroshi Saito, Tokyo (JP); Yuichi Goto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 13/770,528

(22) Filed: Feb. 19, 2013

(65) Prior Publication Data
US 2014/0042998 A1 Feb. 13, 2014

(30) Foreign Application Priority Data
Aug. 10, 2012 (JP) ................................. 2012-177977

(51) Int. Cl.
| | |
|---|---|
| G05F 1/575 | (2006.01) |
| H02M 3/156 | (2006.01) |
| G05F 1/46 | (2006.01) |
| H02M 3/158 | (2006.01) |
| H02M 1/00 | (2007.01) |

(52) U.S. Cl.
CPC ............. *G05F 1/468* (2013.01); *H02M 3/1588* (2013.01); *H02M 2001/0003* (2013.01); *Y02B 70/1466* (2013.01)

(58) Field of Classification Search
CPC ............................... G05F 1/575; H02M 3/156
USPC ......... 323/273, 280, 282, 265, 268, 283, 285, 323/351
See application file for complete search history.

(56) References Cited

U.S. PATENT DOCUMENTS

| | | | |
|---|---|---|---|
| 8,089,261 B2 | 1/2012 | Lipka | |
| 2007/0159146 A1* | 7/2007 | Mandal | 323/280 |
| 2009/0179622 A1* | 7/2009 | Ivanov et al. | 323/271 |
| 2009/0295341 A1* | 12/2009 | Nakamura et al. | 323/222 |
| 2010/0289475 A1* | 11/2010 | Lipka | 323/315 |

FOREIGN PATENT DOCUMENTS

| | | |
|---|---|---|
| JP | 2003273670 A | 9/2003 |
| JP | 2005084869 A | 3/2005 |
| JP | 2005-304226 | 10/2005 |

(Continued)

OTHER PUBLICATIONS

Japanese Office Action dated Jul. 3, 2015, filed in Japanese counterpart Application No. 2012-177977, 20 pages (with translation).

*Primary Examiner* — Timothy J Dole
*Assistant Examiner* — Sisay G Tiku
(74) *Attorney, Agent, or Firm* — Patterson & Sheridan, LLP

(57) ABSTRACT

A DC-DC converter includes a high-side circuit supplied with a power supply voltage and a first internal reference voltage generated by a first regulator. The high-side circuit provides a current to an inductor, which is used for generating an output voltage. The first and second regulators each generate respective internal reference voltages. The second internal reference voltage is provided to a signal processing module, which controls the high side circuit so that the output voltage of the DC-DC converter corresponds to regulated target voltage level. The first and second regulators include a differential circuit comparing voltages and generating a corresponding comparison signal, a transistor for generating the internal reference voltage according to a gate voltage applied to its gate, and a circuit to change the gate voltage to reduce a signal amplitude of the comparison signal.

13 Claims, 30 Drawing Sheets

(56) References Cited

FOREIGN PATENT DOCUMENTS

| | | |
|---|---|---|
| JP | 2006-230112 | 8/2006 |
| JP | 2008-017625 | 1/2008 |
| JP | 2009272415 A | 11/2009 |
| JP | 2010-004258 A | 1/2010 |
| JP | 2011113567 A | 6/2011 |
| JP | 2012-016123 | 1/2012 |

* cited by examiner

US 9,195,247 B2

DC-DC CONVERTER

CROSS-REFERENCE TO RELATED APPLICATION

This application is based upon and claims the benefit of priority from Japanese Patent Application No. 2012-177977, filed Aug. 10, 2012, the entire contents of which are incorporated herein by reference.

FIELD

Embodiments described herein relate generally to a DC-DC converter.

BACKGROUND

In general, when the potential difference between an internal reference voltage of a DC-DC converter and a power supply voltage is not very large, a low-noise series regulator with a simple circuit configuration is often used. But, when an output circuit of a DC-DC converter carries out a switching operation, the current flowing to the output line of an internal reference voltage-generating circuit in the DC-DC converter changes considerably. To be able to respond to a steep current change, an output circuit system of the internal reference voltage-generating circuit may be designed as a source follower or emitter follower.

However, in a source follower or emitter follower, because there is a voltage drop of the source (emitter)-to-gate voltage Vgs or Vbe, the operating voltage range of the internal reference voltage-generating circuit is also reduced.

To secure a wide operating voltage range, it is effective to use a low-dropout regulator (LDO: Low Dropout Regulator) in which a large capacitance is added to the output line of the internal reference voltage-generating circuit. The reason why a large capacitance is added is that the frequency response characteristic is slow in the conventional LDO. The LDO is a series regulator that operates even if the potential difference between the input and output voltage is about 0.1 V.

DETAILED DESCRIPTION

This disclosure describes a DC-DC converter that can be operated in a wide power supply voltage range. In general, the embodiments of the present invention will be explained with reference to the figures.

An embodiment of a DC-DC converter includes a high-side circuit connected to an inductor; a first regulator that generates a first internal reference voltage; a second regulator that generates a second internal reference voltage; and a signal processing module that controls the high-side circuit so that a difference between an output voltage, which is output at a connection node of an output capacitor and the inductor, and a prescribed reference voltage is reduced. Additionally, the first regulator and the second regulator each include a differential circuit for generating a comparison signal corresponding to the voltage difference between the prescribed reference voltage and a control voltage correlated to the internal reference voltages, which are output from the regulators; a first transistor for generating the internal reference voltages based on a gate voltage applied to its gate; and a circuit for changing the gate voltage so that a signal amplitude of the comparison signal is decreased.

Figure 1:
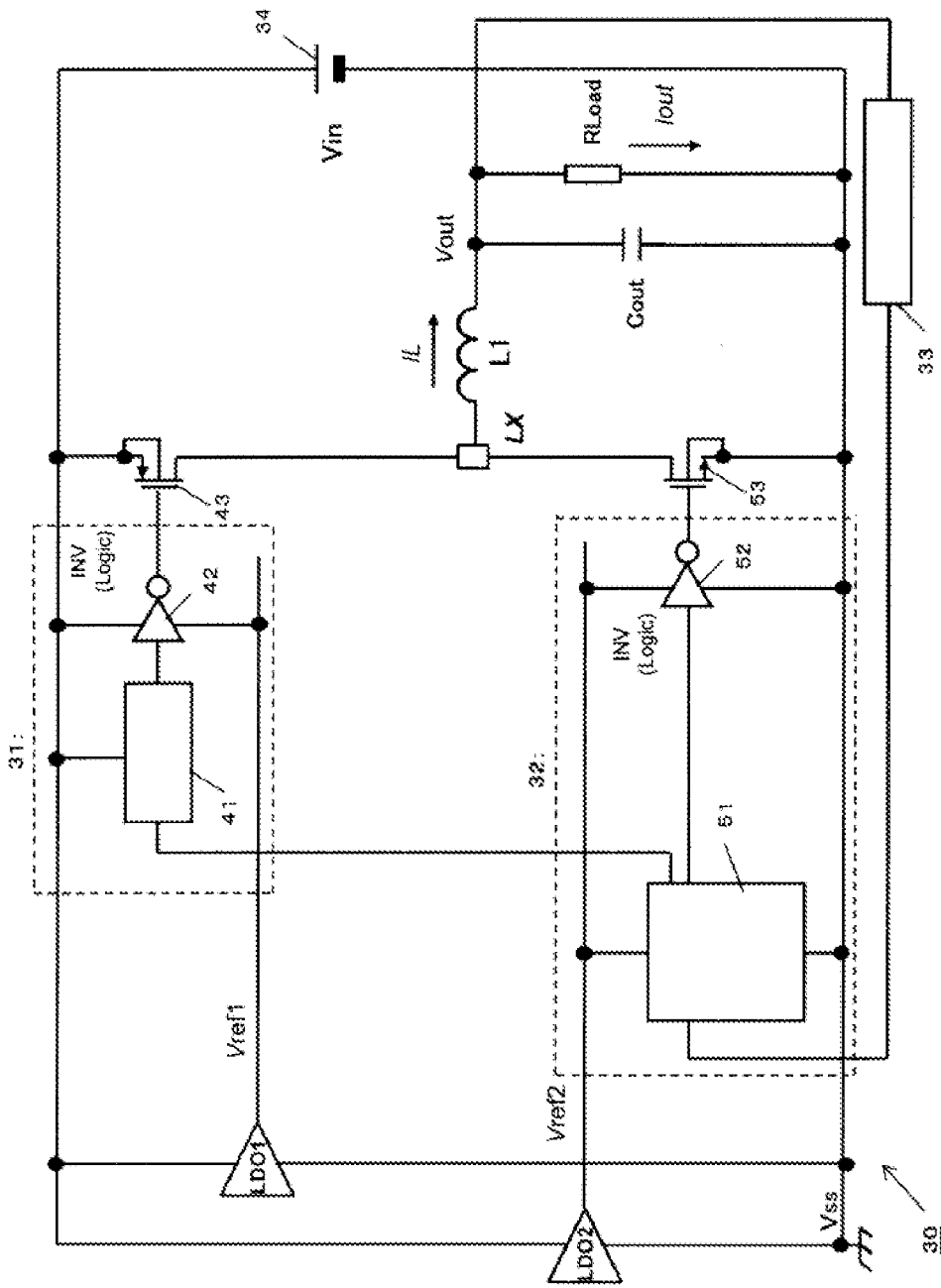
FIG. 1 is a circuit diagram showing a DC-DC converter according to an embodiment.

FIG. 1 is a circuit diagram showing a DC-DC converter 30 of an embodiment. The DC-DC converter 30 of FIG. 1 can be built in a semiconductor chip as an integrated circuit and includes a high-side driver 31, high-side switch 43, low-side driver 32, low-side switch 53, first low-dropout (first LDO) regulator LDO1 as a first regulator, second low-dropout (second LDO) regulator LDO2 as a second regulator, and error voltage-detector 33. The high-side driver 31 and the high-side switch 43 are high-side circuits, and the low-side driver 32 and the low-side switch 53 are low-side circuits. In addition, the first LDO regulator LDO1 is an internal reference voltage-generating circuit for the high-side circuits, and the second LDO regulator LDO2 is an internal reference voltage-generating circuit for the low-side circuits.

Next, an example in which the DC-DC converter 30 of FIG. 1 is integrated in a semiconductor chip will be explained.

Both an output line of the high-side switch 43 and an output line of the low-side switch 53 are connected to an output pin LX. A first end of an inductor L1, which is externally attached (e.g., not integrated on the chip), is connected to the output pin LX. A first terminal of an output capacitor Cout, which is externally attached, is connected to the second end of the inductor L1. The second terminal of the output capacitor Cout is grounded, and a load resistor RLoad is connected in parallel with the output capacitor Cout. A final output voltage Vout is output from a connection node of the second end of the inductor L1 and first terminal of the output capacitor Cout.

The DC-DC converter 30 of FIG. 1 takes in a direct-current input voltage Vin and generates a step-down output voltage Vout. This output voltage is output from the second end of the inductor L1.

Using the input voltage Vin and a ground voltage Vss, the first LDO regulator LDO1 generates a first internal reference voltage Vref1, which is about 5V lower than the input voltage Vin, and supplies the reference voltage to the high-side driver 31. As will be described later, an n-type MOS transistor not shown in FIG. 1 is installed at an output stage of the first LDO regulator LDO1.

Using the input voltage Vin and the ground voltage, the second LDO regulator LDO2 generates a second internal reference voltage Vref2, which is about 5 V higher than the ground voltage, and supplies the reference voltage to the low-side driver 32. As will be explained later, a p-type MOS transistor not shown in FIG. 1 is installed at an output stage of the second LDO regulator LDO2.

The high-side driver 31 has a level shift circuit 41 and an inverter 42, and the high-side switch 43 can be turned "on" or "off" by an output signal of the inverter 42. Since the inverter 42 is operated at a logic level that requires 5 V of power, the high-side driver 31 generates a logic level by the input voltage Vin and the first internal reference voltage Vref1. The high-side switch 43, for example, is a p-type LDMOS transistor.

The low-side driver 32 has a signal processing part 51 and an inverter 52, and the low-side switch 53 can be turned "on" or "off" by an output signal of the inverter 52. The low-side switch 53, for example, is an n-type LDMOS transistor.

The error voltage-detecting part 33 detects a differential voltage between the output voltage Vout and the internal reference voltage and sends it to the signal processing part (module) 51. The signal processing part 51 generates a PWM (pulse width modulation) signal for controlling the switching of the high-side switch 43 and the low-side switch 53 so that the differential voltage reaches a prescribed voltage (for example, 0.8 V).

Since the signal processing part 51 and the inverter 52 in the low-side driver 32 are operated at a logic level that requires 5 V power, the low-side driver 32 generates a logic level by the ground voltage and the second internal reference voltage Vref2.

Next, the operation of the DC-DC converter 30 of FIG. 1 will be explained. The high-side driver 31 and the low-side driver 32 are periodically turned "on" or "off" in an alternating fashion. If the high-side switch 43 of the high-side driver 31 is turned on, current flows into the inductor L1 through the source-to-drain spacing of the high-side switch 43 from a direct-current voltage source 34 for generating the input voltage Vin; energy is thereby stored in the inductor L1. At this time, the low-side switch 53 is off.

At the next cycle, the high-side switch 43 is turned off, and the low-side switch 53 is turned on. Therefore, the current from the inductor L1 flows to the ground terminal through the drain-to-source spacing of the low-side switch 53.

This operation is periodically repeated. Since the output capacitor Cout is connected to the other end of the inductor L1, the voltage amplitude at the other end of the inductor L1 is almost constant, so that the output voltage Vout, which is output from the other end of the inductor L1, turns into a direct-current voltage.

The error voltage detection part (module) 33 sends the differential voltage between the output voltage Vout and a prescribed reference voltage as an error voltage to the signal processing part 51, and the signal processing part 51 generates a PWM signal corresponding to the error voltage so that the error voltage is lowered. This PWM signal is transmitted to the gate of the low-side switch 53 via the inverter 52, and the voltage level is changed by the level shift circuit 41 and supplied to the gate of the high-side switch 43 via the inverter 42. Therefore, the error voltage-detecting part 33 and the signal processing part 51 control the output voltage Vout so that the output voltage Vout reaches a desired voltage level.

Figure 2:
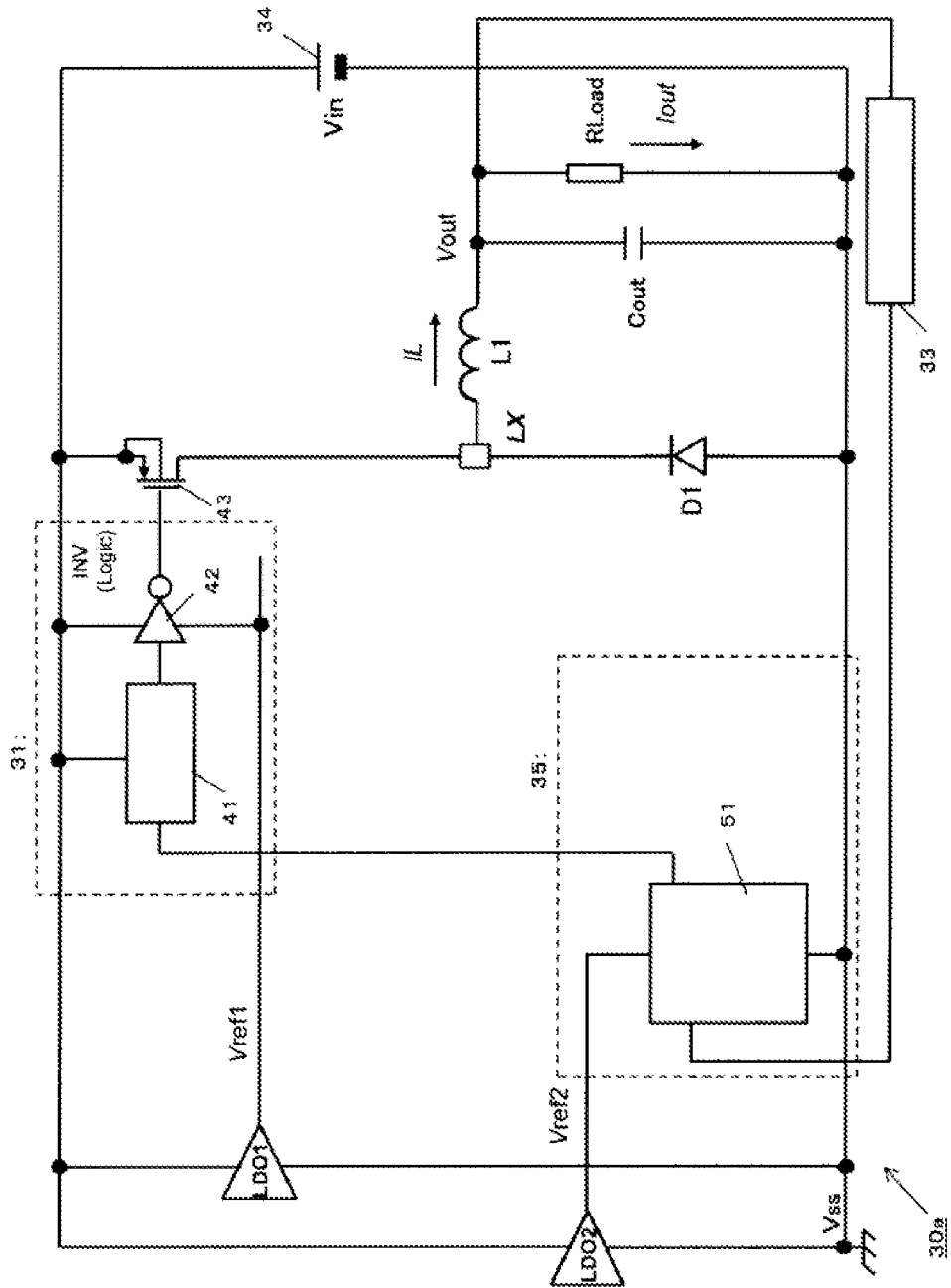
FIG. 2 is a circuit diagram showing a modified example of a DC-DC converter in which feedback control is carried out only at a high side.

The DC-DC converter 30 of FIG. 1 is a synchronous rectifying/step-down DC-DC converter that feedback-controls both a high side and a low side based on the output signal of the signal processing part 51; however, an asynchronous rectifying/step-down DC-DC converter that feedback-controls only the high side may also be adopted. For example, FIG. 2 is a circuit diagram showing an asynchronous rectifying/step-down DC-DC converter 30a that feedback-controls only the high side. The DC-DC converter 30a of FIG. 2 is different from that of FIG. 1 in that it has a low voltage module 35 having the signal processing part 51 for signal processing and a rectifier diode D1. The anode of the rectifier diode D1 is set to a ground voltage, and its cathode is connected to one end LX of the inductor L1.

The DC-DC converter 30a of FIG. 2 does not feedback-control the current at a low side; however, since the low-side switch 53 and the inverter are unnecessary, the circuit constitution can be simplified, as compared to FIG. 1.

The first LDO regulator LDO1 and the second LDO regulator LDO2 in FIG. 1 and FIG. 2 are not conventional LDO regulators but are LDO regulators that are sped up by a circuit constitution that will be described later. Since the conventional LDO regulators cannot rapidly respond to the change of the output capacitance if current flowing in output lines of the LDO regulators is steeply changed, the output voltage of the LDO regulators is temporarily changed, causing a concern that the DC-DC converter built using such LDO regulators may malfunction. For this reason, when a conventional LDO is used, bypass capacitors with an external large capacitance are essential for the output lines of the LDO regulators. But the first LDO regulator LDO1 and the second LDO regulator LDO2 of this embodiment are provided with a high-speed property that can quickly respond to the change of each output capacitance, and an external large-capacitance bypass capacitor is not required.

The reason why the first LDO regulator LDO1 is constructed to have the high speed property that can quickly respond to the change of its output capacitance is that a control voltage is controlled in accordance with the voltage change of the first internal reference voltage Vref1 by active control using a transistor so that the voltage difference between the control voltage correlated to the first internal reference voltage Vref1 and a prescribed reference voltage is decreased; this rapidly suppresses the change of the first internal reference voltage Vref1. The second LDO regulator LDO2 is also similar.

Therefore, in the DC-DC converters 30 and 30a, the first LDO regulator LDO1 for generating the first internal reference voltage Vref1 for the high-side driver 31 and the second LDO regulator LDO2 for generating the second internal reference voltage Vref2 for the low-side driver 32 are constituted by high-speed LDO regulators with a wide band and good responsivity to a load change. In this design, it is unnecessary to connect the external bypass capacitors, and output pins for bypass capacitor connection need not be installed in a semiconductor chip in which the DC-DC converters 30 and 30a are built.

In the first LDO regulator LDO1 and the second LDO regulator LDO2 of this embodiment, the connection of bypass capacitors to their output lines, however, is not always unnecessary; if necessary, the bypass capacitors can be connected. However, the required capacitance of the bypass capacitors remains as a capacitance (for example, 1,000 pF or lower) to the degree that the required bypass capacitors can be integrated in a semiconductor chip. Therefore, in case the first LDO regulator LDO1 and the second LDO regulator LDO2 of this embodiment are used, the output pins for external attachment of the bypass capacitors are not installed in a semiconductor chip; therefore a semiconductor package with a small number of pins can be utilized, which allows for a reduction in the manufacturing cost of the chip.

Next, a detailed circuit constitution of the first LDO regulator LDO1 and the second LDO regulator LDO2 of this embodiment will be explained. Several kinds of circuit constitutions of the first LDO regulator LDO1 and the second LDO regulator LDO2 are considered; however, all of the circuit constitutions have a common characteristic in which the responsivity to the change of a steep output capacitance is good and the frequency band is wide.

(First Example of High-Speed LDO)

Figure 3:
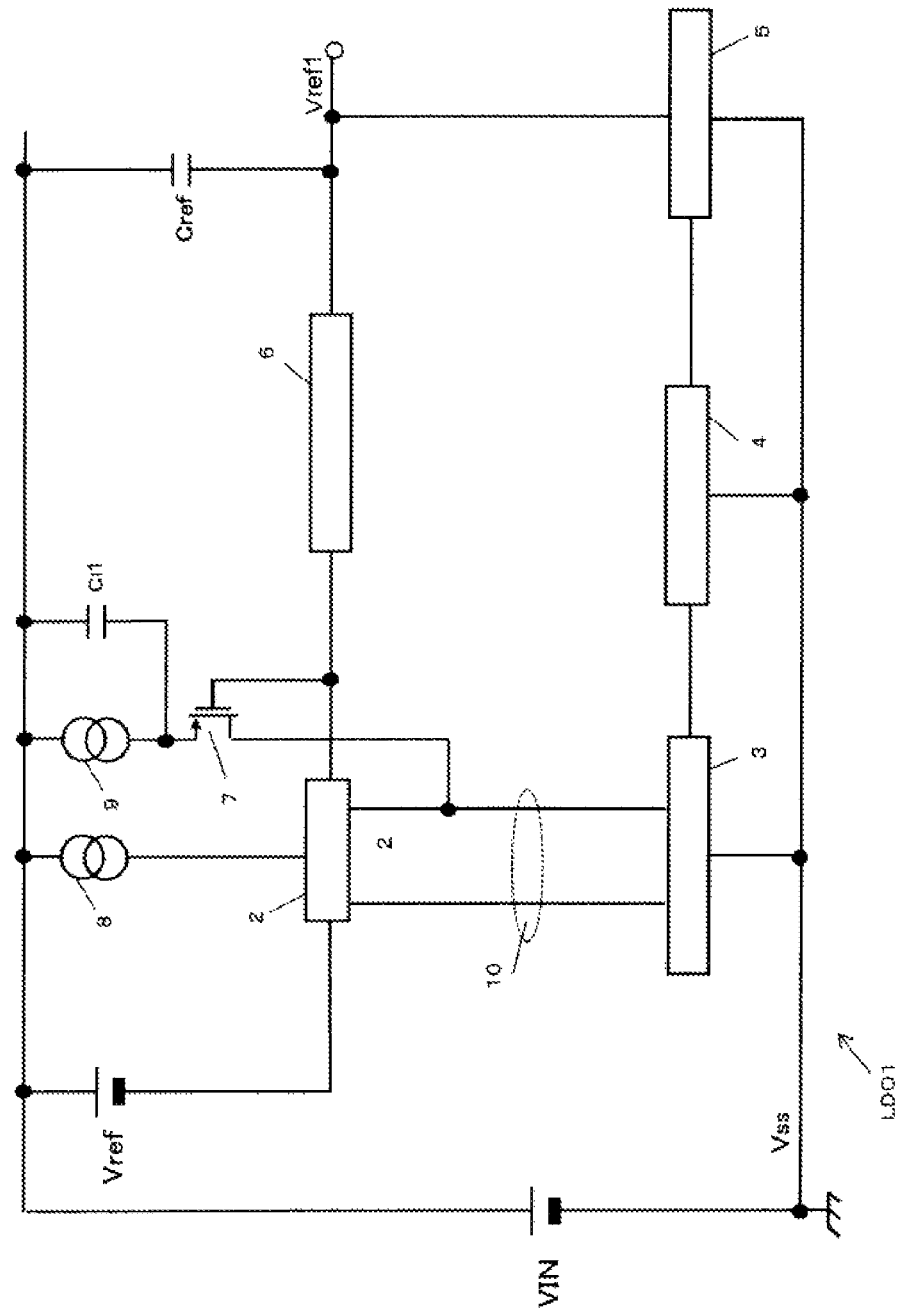
FIG. 3 is a circuit diagram showing a first example of a first LDO regulator.

FIG. 3 is a circuit diagram showing an internal constitution of a first example of the first LDO regulator LDO1. The first LDO regulator LDO1 of FIG. 1 is provided with a differential circuit 2, first current mirror circuit 3, phase-compensating circuit 4, output transistor (first transistor) 5, voltage-dividing circuit 6, transistor (second transistor) 7, phase-compensating capacitor (first capacitor) Ci1, and first and second current sources 8 and 9.

The differential circuit 2 generates a comparison signal corresponding to the voltage difference between a prescribed reference voltage Vref and a control voltage correlated to the first internal reference voltage Vref1. The output transistor 5 generates the first internal reference voltage Vref1 based on the comparison signal. For example, a voltage change suppressing circuit including the voltage-dividing circuit 6 and the transistor 7 controls the control voltage in response to the voltage change of the first internal reference voltage Vref1 so that the signal amplitude of the comparison signal is decreased.

Figure 4:
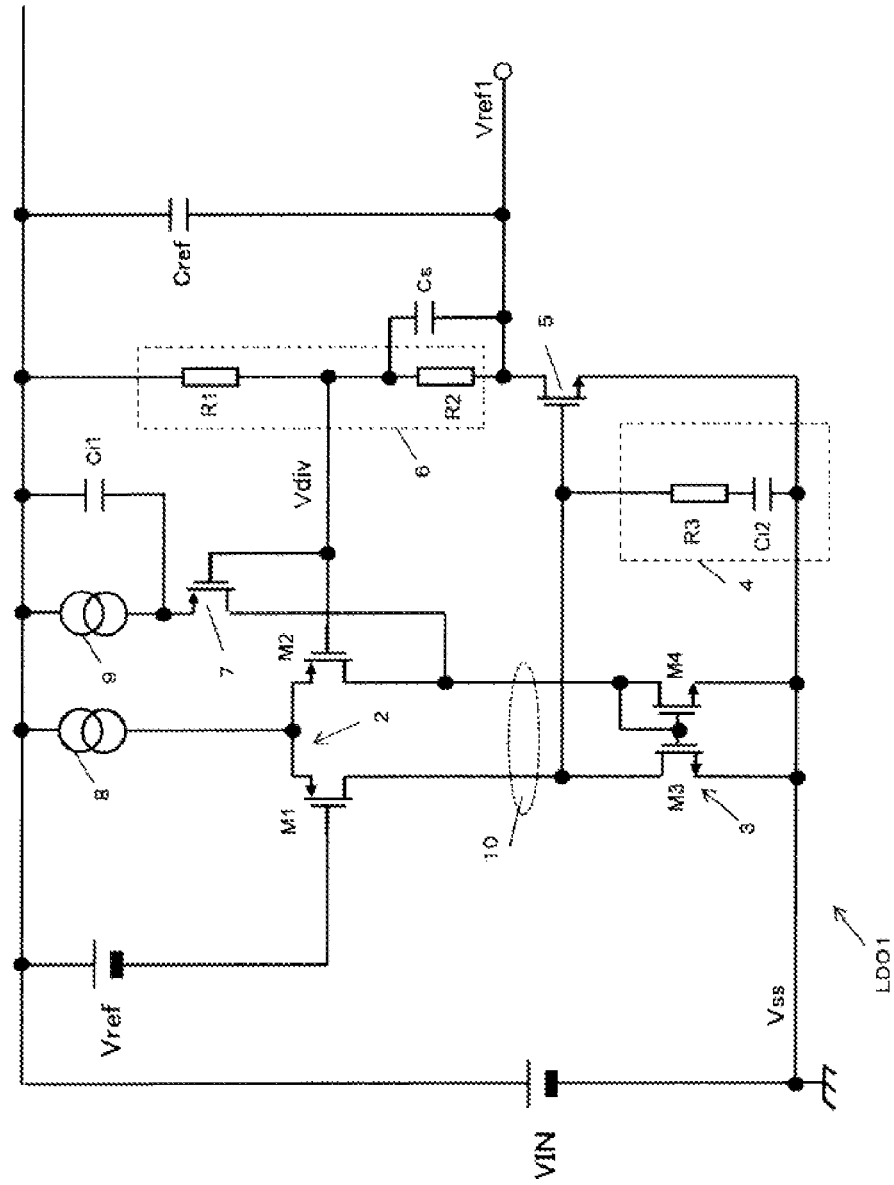
FIG. 4 is a circuit diagram showing an example in which a differential circuit, a first current mirror circuit, a phase-compensating circuit, an output transistor, and a voltage dividing circuit are embodied.

FIG. 4 is a circuit diagram showing an example in which an internal constitution of the differential circuit 2, first current mirror circuit 3, phase-compensating circuit 4, output transistor 5, and voltage-dividing circuit 6 of FIG. 3 is embodied. FIG. 4 is an example, and the details of the circuits of the internal constitution of these circuits are not limited to those shown in FIG. 4.

As shown in FIG. 4, the voltage-dividing circuit 6 has several resistors R1 and R2 connected in series between an input voltage VIN line (first power supply voltage line) for supplying an input voltage VIN and a first internal reference voltage Vref1 line for outputting the first internal reference voltage Vref1; it also outputs a divided voltage Vdiv in which the first internal reference voltage Vref1 between these resistors R1 and R2 is divided. A capacitor Cs is connected at both ends of the resistor R2.

Between the input voltage VIN line and the first internal reference voltage Vref1 line, an output capacitor Cref is connected. In many cases, the conventional first LDO regulator LDO1 has used a capacitor (for example, tantalum capacitor or electrolytic capacitor) with a large loss resistance component (ESR: Equivalent Series Resistance) of a dielectric or electrode as a detailed kind of the output capacitor Cref for phase compensation; or, apart from the capacitor, the ESR has been connected in series to the capacitor. However, in this embodiment, as will be described later, it is not required that the phase is compensated by the output capacitor Cref, and thus, a ceramic capacitor may be used. It is known that a ceramic capacitor has a small resistance value of the ESR, which is internally installed. However, according to this embodiment, a wide band can be formed even by a ceramic capacitor element, and the ESR is not required to be externally attached to the ceramic capacitor.

It is known that the tantalum capacitor or electrolytic capacitor is likely to cause a fire; since the ceramic capacitor, which is not likely to cause a fire, can also be used, the reliability of the LDO regulators can be improved.

In case a load is directly driven by the first LDO regulator LDO1, a load resistance is connected in parallel with the output capacitor Cref. The resistance value of this load resistance depends upon the operation of the load. For example, if a CPU is connected to be the load, since the load current depends largely upon the operation mode of the CPU, the load resistance is also changed. As will be described later, the first LDO regulator LDO1 can rapidly suppress the change of the first internal reference voltage Vref1, even if the load resistance changes.

The differential circuit 2 generates a comparison signal corresponding to the voltage difference between the reference voltage Vref and the divided voltage Vdiv. The differential circuit 2 has a pair of PMOS transistors M1 and M2 to which a source is commonly connected, a reference voltage Vref is input into the gate of the PMOS transistor M1, and the divided voltage Vdiv is input into the gate of the PMOS transistor M2. In addition, the first current mirror circuit 3 is connected to the drains of the PMOS transistors M1 and M2. In this specification, signal paths connecting the drains of the pair of PMOS transistors M1 and M2 and the first current mirror circuit 3 are called a pair of differential output lines 10. Between the source of the PMOS transistors M1 and M2 and the input voltage VIN line, the first current source 8 is connected.

The gate of the PMOS transistor M1 is an inverted input terminal of the differential circuit 2, and the gate of the PMOS transistor M2 is a non-inverted input terminal of the differential circuit 2. In this embodiment, the divided voltage Vdiv input into the non-inverted input terminal of the differential circuit 2 is compared with the reference voltage Vref input into the inverted input terminal; a comparison signal corresponding to the voltage difference between them is input into the gate of the output transistor 5; and the first internal reference voltage Vref1 is feedback-controlled.

Between one of the pair of differential output lines 10 and the input voltage VIN line, the transistor 7 and the second current source 9 are connected in series. More specifically, the drain of the transistor 7 is connected to one of the differential output lines, and its source is connected to one end of the second current source 9. The phase-compensating capacitor Ci1 is connected in parallel with the second current source 9. In addition, the divided voltage Vdiv is input into the gate of the transistor 7. Therefore, the transistor 7 amplifies a high-frequency signal overlapped with the first internal reference voltage Vref1 and supplies the signal to one of the pair of differential output lines 10. The second current source 9 is connected between the source of the transistor 7 and the input voltage VIN line.

The phase-compensating capacitor Ci1 charges and discharges electric charges corresponding to the high-frequency signal overlapped with the first internal reference voltage Vref1 and controls the current flowing in one of the pair of differential output lines 10 via the transistor 7 in accordance with the amount of electric charges that are charged and discharged.

The other one of the pair of differential output lines 10 is connected to the gate of the output transistor 5. A ground line VSS is connected to the source of the output transistor 5, and its drain is connected to the first internal reference voltage Vref1. In addition, the phase-compensating circuit 4 is connected between the source and the gate of the output transistor 5. This phase-compensating circuit 4 is not essential and may be omitted. The phase-compensating circuit 4 has a capacitor Ci2 and a resistor R3 connected in series.

Next, the operation of the first LDO regulator LDO1 of FIG. 4 will be explained. First, a direct-current operation of the first LDO regulator LDO1 will be explained. The differential circuit 2 generates a comparison signal corresponding to the voltage difference between the reference voltage Vref and the divided voltage Vdiv of the first internal reference voltage Vref1. This comparison signal is input into the gate of the output transistor 5. Between the input voltage VIN line and the ground line VSS, a drain-to-source spacing of the voltage-dividing circuit 6 and the output transistor 5 is connected, and the first internal reference voltage Vref1 is output from its drain. Since the drain-to-source resistance of the output transistor 5 can be changed by the comparison signal, the voltage level of the first internal reference voltage Vref1 can be controlled at the input voltage VIN.

For example, if the divided voltage Vdiv of the first internal reference voltage Vref1 is higher than the reference voltage Vref, the gate voltage of the output transistor 5 is raised, so that the source-to-drain resistance of the output transistor 5 as an NMOS transistor is lowered, thereby lowering the first internal reference voltage Vref1. As a result, the divided voltage Vdiv of the first internal reference voltage Vref1 is also lowered.

Next, an alternating-current operation of the first LDO regulator LDO1 will be explained. In case a high-frequency signal is overlapped with the first internal voltage reference Vref1 by the load change of the DC-DC converters 30 and 30a, since the capacitor Cs is connected in parallel with the resistor R2 in the voltage-dividing circuit 6, the voltage of the divided voltage Vdiv generated by the voltage dividing circuit 6 is also instantly changed by the influence of the high-frequency signal. Therefore, the transistor 7 cycles between being "on" and "off" at a frequency of the overlapped high-frequency signal; the phase-compensating circuit Ci1 is charged and discharged; and the drain current of the transistor 7 is changed. Since the drain of the transistor 7 and the drain of the transistor M2 are connected and the transistor M2 and the transistor M1 constitute the differential circuit 2, if the drain current of the transistor 7 changes, the drain current of the transistor M1 also changes. This, in turn, changes the gate voltage of the transistor 5 at a frequency of the high-frequency signal. Therefore, in the first internal reference voltage Vref1 connected to the drain of the transistor 5, the voltage level is changed by the frequency of the high-frequency signal, and the gain of the high-frequency signal is increased.

Therefore, in the first LDO regulator LDO1 of FIG. 2, in case the high-frequency signal is overlapped with the first internal reference voltage Vref1, the gain of the high-frequency signal can be increased. This control is very rapidly carried out, which allows for a wide band.

Here, in the first LDO regulator LDO1 of FIG. 2, the transistor 7, first current source 8, and phase compensating circuit Ci1 are connected to only one transistor M2 at the inverted input side of the pair of transistors M1 and M2 in the differential circuit 2; additionally, and the differential circuit 2 has an asymmetric circuit constitution. For this reason, if the pair of transistors M1 and M2 is the same size, a large offset voltage is generated in the first internal reference voltage Vref1.

Therefore, for an offset adjustment, it is desirable to change the size ratio of the transistors M1 and M2 or to change the size ratio of a pair of transistors M3 and M4 in the first current mirror circuit 3.

In the first LDO regulator LDO1 of FIG. 2, one end of the phase compensating circuit Ci1 is connected to the input voltage VIN line; however, it is not necessarily required that the phase compensating circuit Ci1 be connected to the input voltage VIN line, as it may also be connected to a stable voltage path with low impedance.

Next, a first example of the second LDO regulator LDO2 will be explained. The second LDO regulator LDO2 has a constitution in which the connection relation of each constituent component between the input voltage VIN line and the ground line Vss of the first LDO regulator LDO1 shown in FIG. 3 and FIG. 4, and the kinds of constituent components to be used are basically the same except for the difference of the conductivity of the transistors. In the following, incase the constituent components to be used are the same, the same reference symbols are given to them, and additional explanation is omitted.

Figure 5:
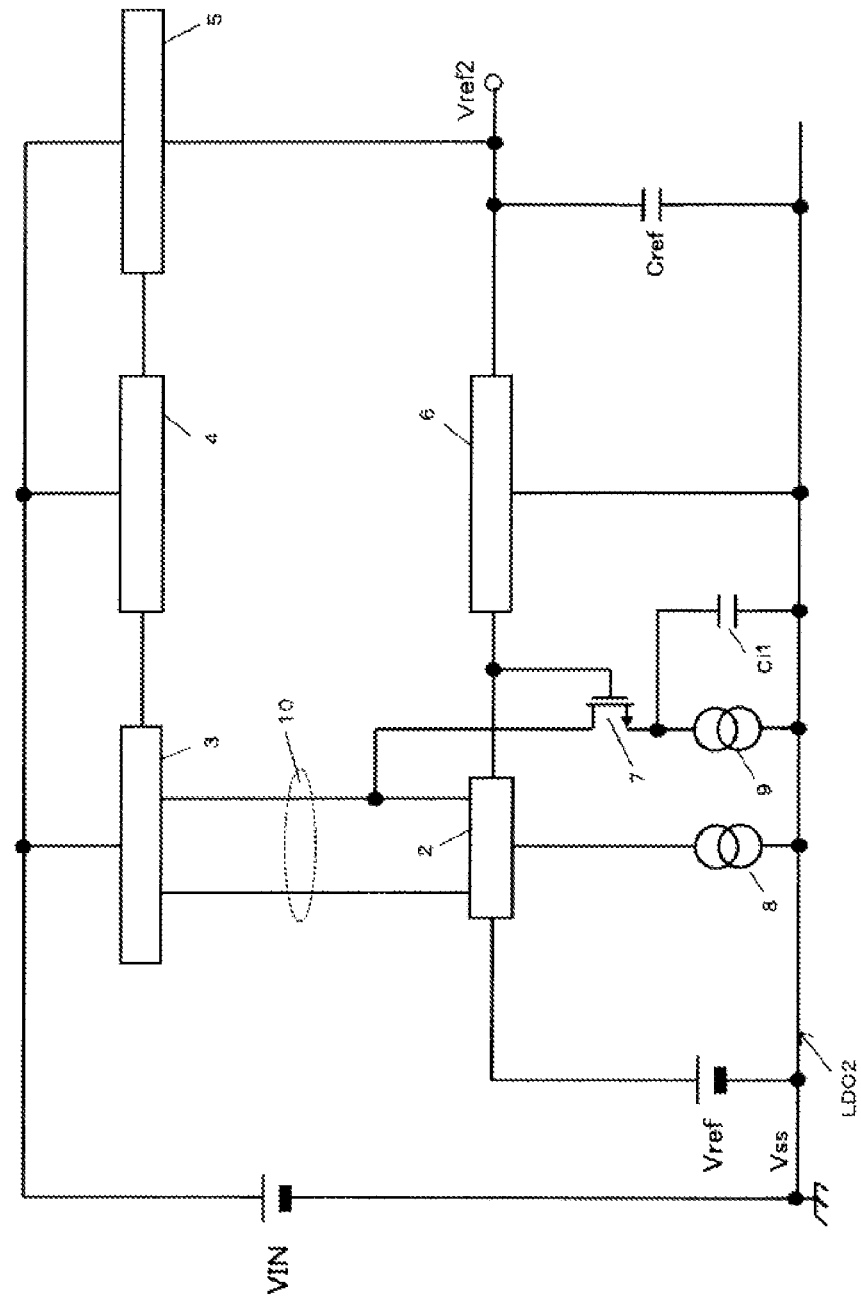
FIG. 5 is a circuit diagram showing a first example of a second LDO regulator.

FIG. 5 is a circuit diagram showing an internal constitution of the first example of the second LDO regulator LDO2. The first LDO regulator LDO1 of FIG. 5 is provided with the differential circuit 2, first current mirror circuit 3, phase compensating circuit 4, output transistor (first transistor) 5, voltage-dividing circuit 6, transistor (second transistor) 7, phase compensating capacitor (first capacitor) Ci1, and first and second current sources 8 and 9.

Each one end of the first current source 8, second current source 9, and phase compensating capacitor Ci1 is connected to a ground line VSS additionally, each end of the first current mirror 3, phase compensating circuit 4, and output transistor 5 is connected to an input voltage VIN line.

The differential circuit 2 in the second LDO regulator LDO2 generates a comparison signal corresponding to the voltage difference between a prescribed reference voltage Vref and a control voltage correlated to the second internal reference voltage Vref2. The output transistor 5 generates the second internal reference voltage Vref2 based on the comparison signal. For example, a voltage change suppressing circuit including the voltage dividing circuit 6 and the transistor 7 controls the control voltage in response to the voltage change of the second internal reference voltage Vref2 so that the signal amplitude of the comparison signal is decreased.

Figure 6:
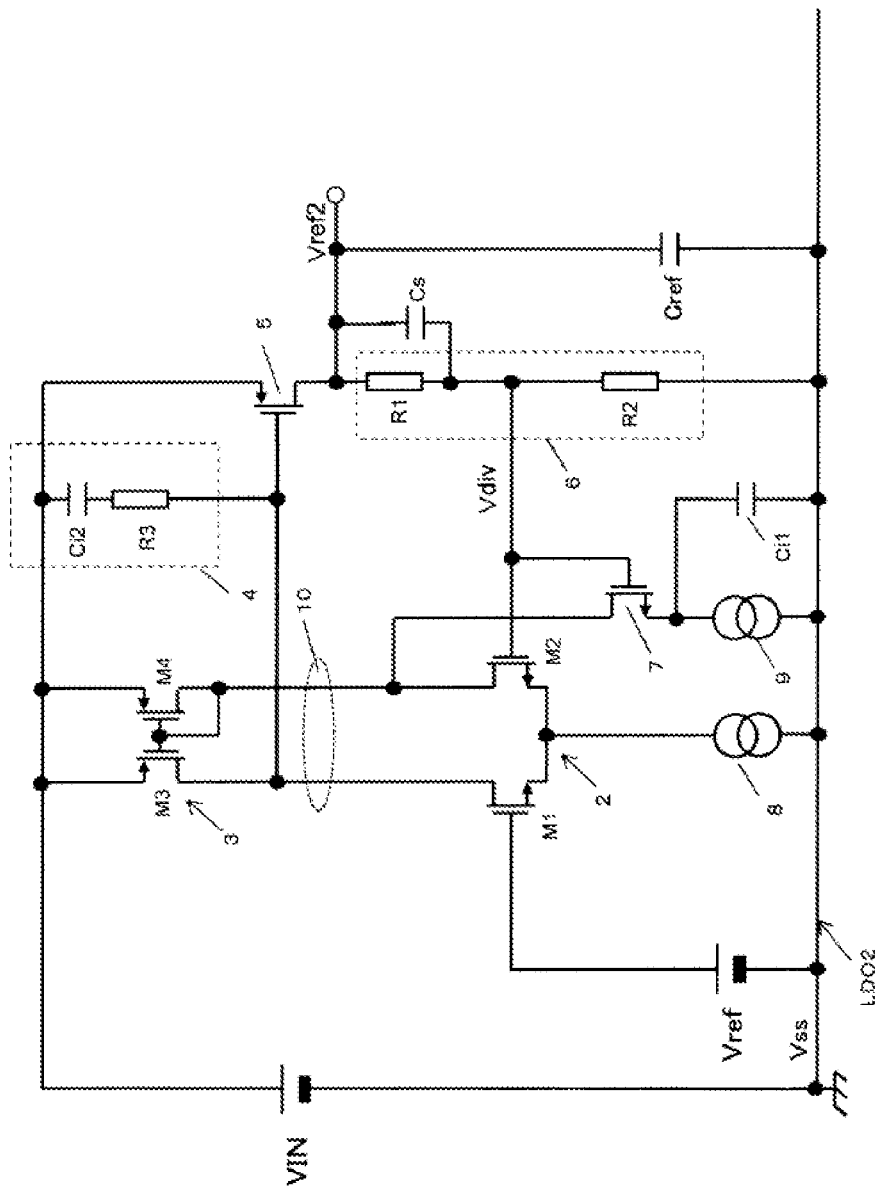
FIG. 6 is a circuit diagram showing another example in which a differential circuit, a first current mirror circuit, a phase-compensating circuit, an output transistor, and a voltage-dividing circuit are embodied.

FIG. 6 is a circuit diagram showing an example in which an internal constitution of the differential circuit 2, first current mirror circuit 3, phase compensating circuit 4, output transistor 5, and voltage dividing circuit 6 of FIG. 3 is embodied. FIG. 6 is an example, and details of circuits of the internal constitution of these circuits are not limited to those shown in FIG. 2.

As shown in FIG. 6, the voltage-dividing circuit 6 has several resistors R1 and R2 connected in series between a second internal reference voltage line Vref2 for outputting the second internal reference voltage Vref2 and a ground line Vss; it outputs a divided voltage Vdiv in which the second internal reference voltage Vref2 between these resistors R1 and R2 is divided. At both ends of the resistor R1, the capacitor Cs is connected.

Since the circuit operation of the second LDO regulator LDO2 shown in FIG. 5 and FIG. 6 is common to the circuit operation of the first LDO regulator LDO1, its explanation is omitted.

Therefore, in the first example of a high-speed LDO, since the transistor 7, phase compensating capacitor Ci1, and first current source 8 are installed at a non-inverted input side of the differential circuit 2 of the first LDO regulator LDO1 and the second LDO regulator LDO2, a high-frequency signal, which is overlapped with the first internal reference voltage Vref1 and the second internal reference voltage Vref2, can be fed back to the gate of the output transistor 5 and amplified; thus, it is possible to realize a wide band of the first LDO regulator LDO1 and the second LDO regulator LDO2.

In addition, in the first example of the high-speed LDO, with the adjustment of each element parameter of the transistor 7, phase compensating capacitor Ci1, and first current source 8, the concern of oscillation disappears, even without separately installing the phase compensating circuit 4, so that the phase compensating circuit 4 is unnecessary and a ceramic capacitor can be used as the output capacitor Cref. In the ceramic capacitor, however, there is a problem in which the ESR effective for phase compensation is small; as previously mentioned, it is unnecessary to carry out the phase compensation by the output capacitor Cref in this embodiment, and in the ceramic capacitor, there is no concern of the outbreak of fire, unlike with a tantalum capacitor or electrolytic capacitor. In addition, since ripple components are few, the reliability and the electric properties are improved. Moreover, as previously mentioned, with the omission of the phase compensating circuit 4, the circuit constitution can be simplified, thus being able to reduce the manufacturing costs.

(Second Example of High-Speed LDO)

The following second example is characterized in that the connection destination of the gate of the transistor 7 is different from that of the first example.

Figure 7:
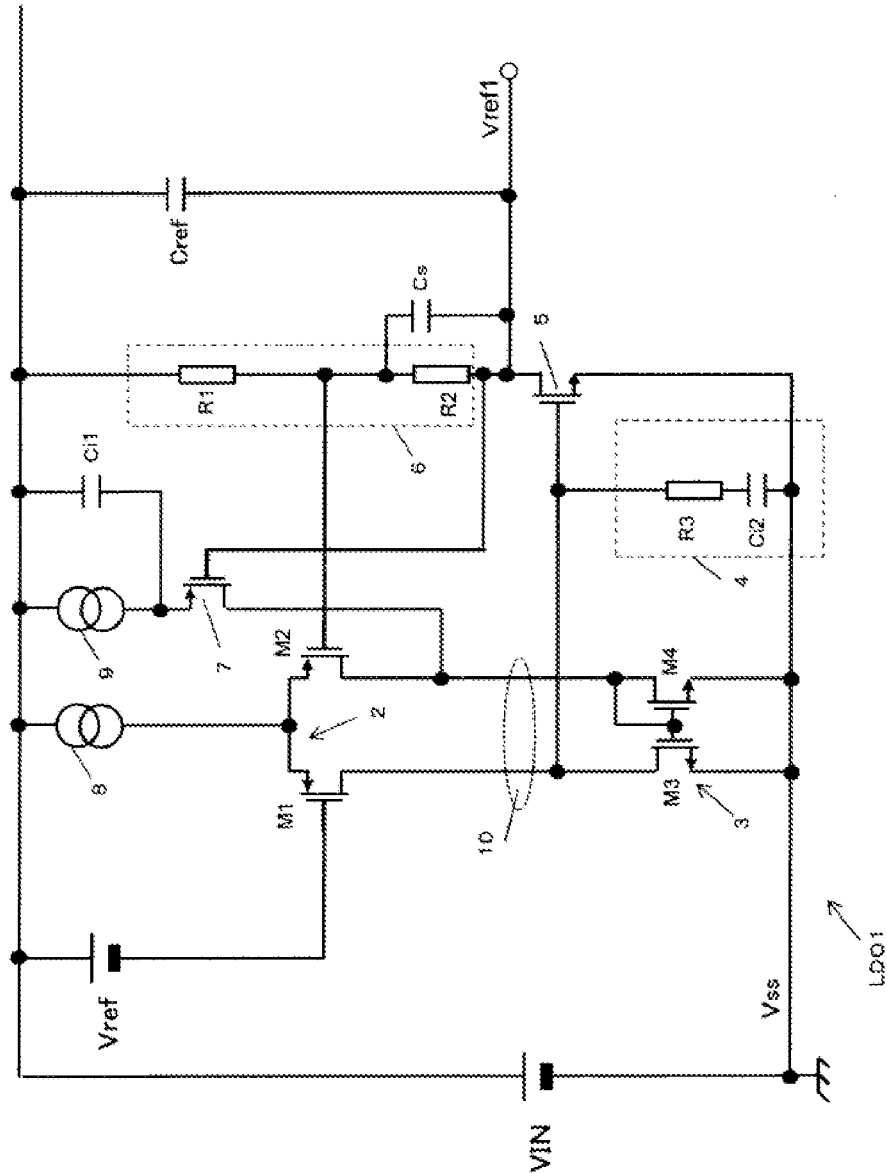
FIG. 7 is a circuit diagram showing a second example of the first LDO regulator.

FIG. 7 is a circuit diagram showing an internal constitution of a second example of the first LDO regulator LDO1. In FIG. 7, the same symbols are given to constituent parts common to those of FIG. 4, and in the following, differences will be explained.

The gate of the transistor 7 in the first LDO regulator LDO1 of FIG. 7 is set to the first internal reference voltage Vref1.

Compared with FIG. 4 and FIG. 7, an effect may be obtained in which the relative precision of the voltage between the second current source 9 and the source of the transistor 7 and the voltage between the first current source 8 and the differential circuit 2 can be raised as depicted in FIG. 4. On the other hand, an effect may be obtained in which a high-frequency signal overlapped with the first internal reference voltage Vref1 can be directly transmitted to the gate of the transistor 7 in FIG. 7. Therefore, FIG. 4 and FIG. 7, respectively, have merits and demerits.

In the first LDO regulator LDO1 of FIG. 7, similarly to FIG. 4, for offset adjustment, it is desirable to change the size ratio of the transistors M1 and M2 or to change the size ratio of the pair of transistors M3 and M4 in the first current mirror circuit 3.

In addition, in the first LDO regulator LDO1 of FIG. 7, each end of the output capacitor Cref and the phase compensating capacitor Ci1 may also be connected to a stable voltage circuit with low impedance instead of connecting them to the input voltage VIN line. Moreover, the phase compensating circuit 4 may be omitted.

Figure 8:
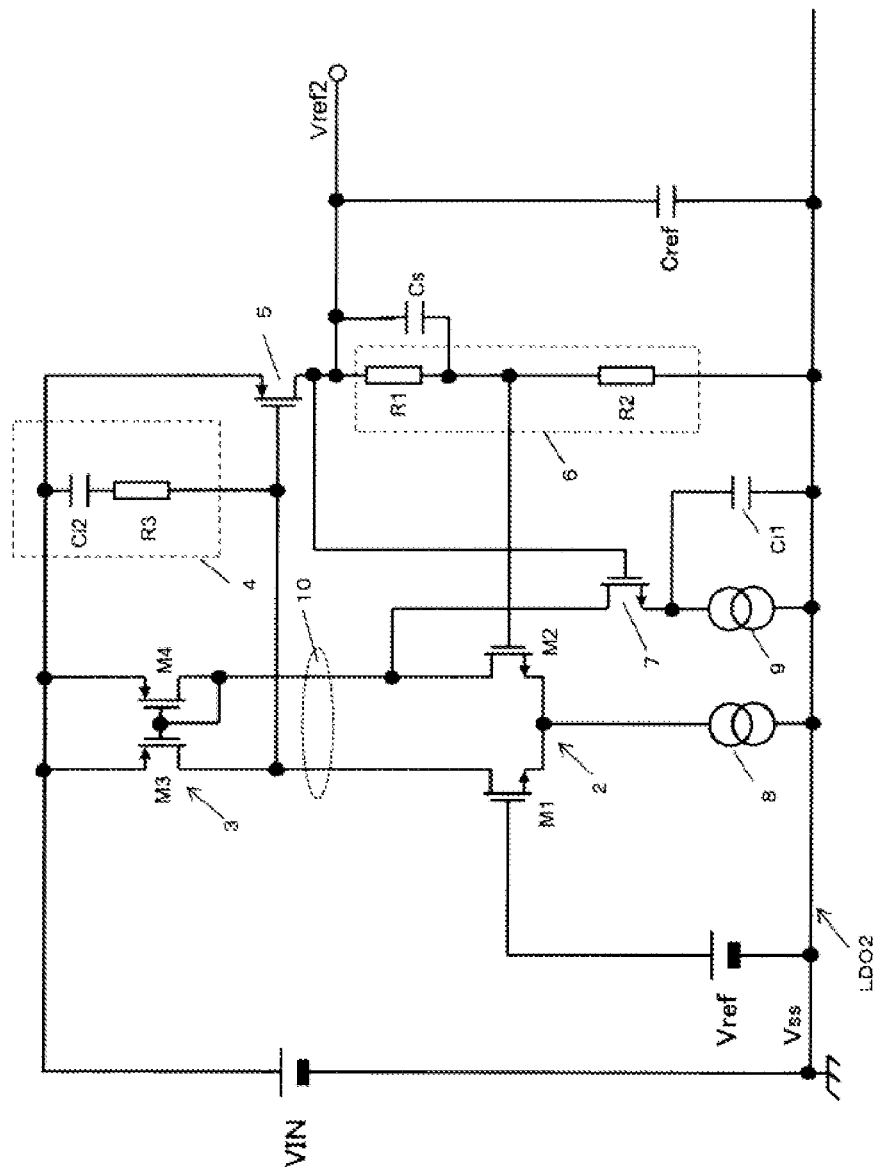
FIG. 8 is a circuit diagram showing a second example of the second LDO regulator.

FIG. 8 is a circuit diagram showing an internal constitution of a second example of the second LDO regulator LDO2. Since the second LDO regulator LDO2 of FIG. 8 has a constitution in which the connection relation of each constituent component between the input voltage VIN line and the ground line VSS of the first LDO regulator LDO1 of FIG. 7 is basically reversed and the circuit operation is also common, a detailed explanation of the second LDO regulator LDO2 of FIG. 8 is omitted.

(Third Example of High-Speed LDO)

The following third example has a constitution characterized in that the inverted input side and the non-inverted input side of the differential circuit 2 are symmetrical to each other.

Figure 9:
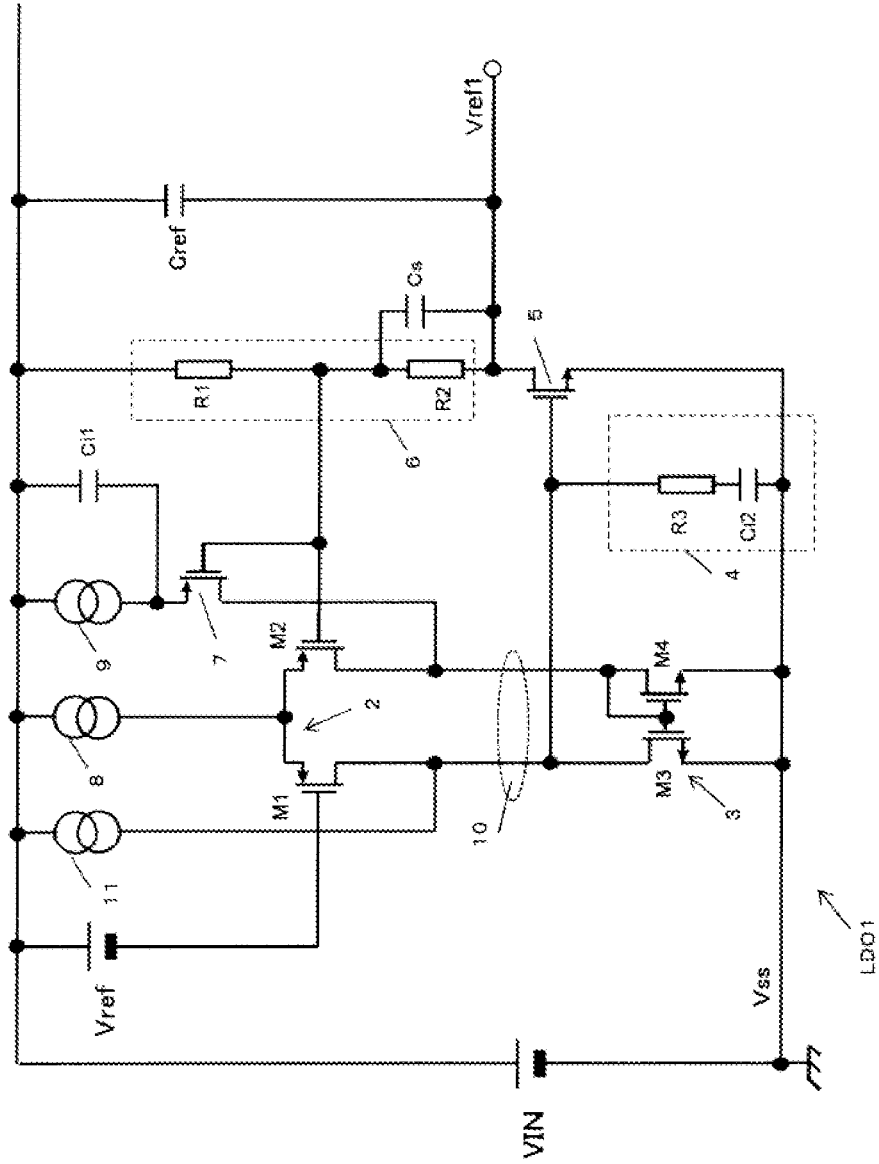
FIG. 9 is a circuit diagram showing a third example of the first LDO regulator.

FIG. 9 is a circuit diagram showing an internal constitution of a third example of the first LDO regulator LDO1. In FIG. 9, the same symbols are given to constituent parts common to those of FIG. 4, and in the following, their differences will be explained.

The first LDO regulator LDO1 of FIG. 9 is provided with a third current source 11 that is connected between the drain of the PMOS transistor M1 in the differential circuit 2 and the input voltage VIN line.

To render symmetry to the third current source 11, its electric properties are preferably the same as those of the second current source 9. Therefore, the voltage of a path between the third current source 11 and the drain of the PMOS transistor M1, the voltage of a path between the second current source 9 and the source of the transistor 7, and the voltage of a path between the first current source 8 and the source of the PMOS transistors M1 and M2 can be aligned, raising the relative precision of the first to third current sources 8, 9, and 11. In addition, with the improvement of the symmetry of the differential circuit 2, the offset voltage of the first internal reference voltage Vref1 can be lowered.

Moreover, in the first LDO regulator LDO1 of FIG. 9, each end of the output capacitor Cref and the phase compensating capacitor Ci1 may also be connected to a stable voltage circuit with low impedance instead of connecting them to the input voltage VIN line. Furthermore, the phase compensating circuit 4 may be omitted.

In FIG. 9, the third current source 11 has been added to the first LDO regulator LDO1 of FIG. 4, however a symmetric constitution in which the third current source 11 is added to the first LDO regulator LDO1 of FIG. 7 may also be adopted.

Figure 10:
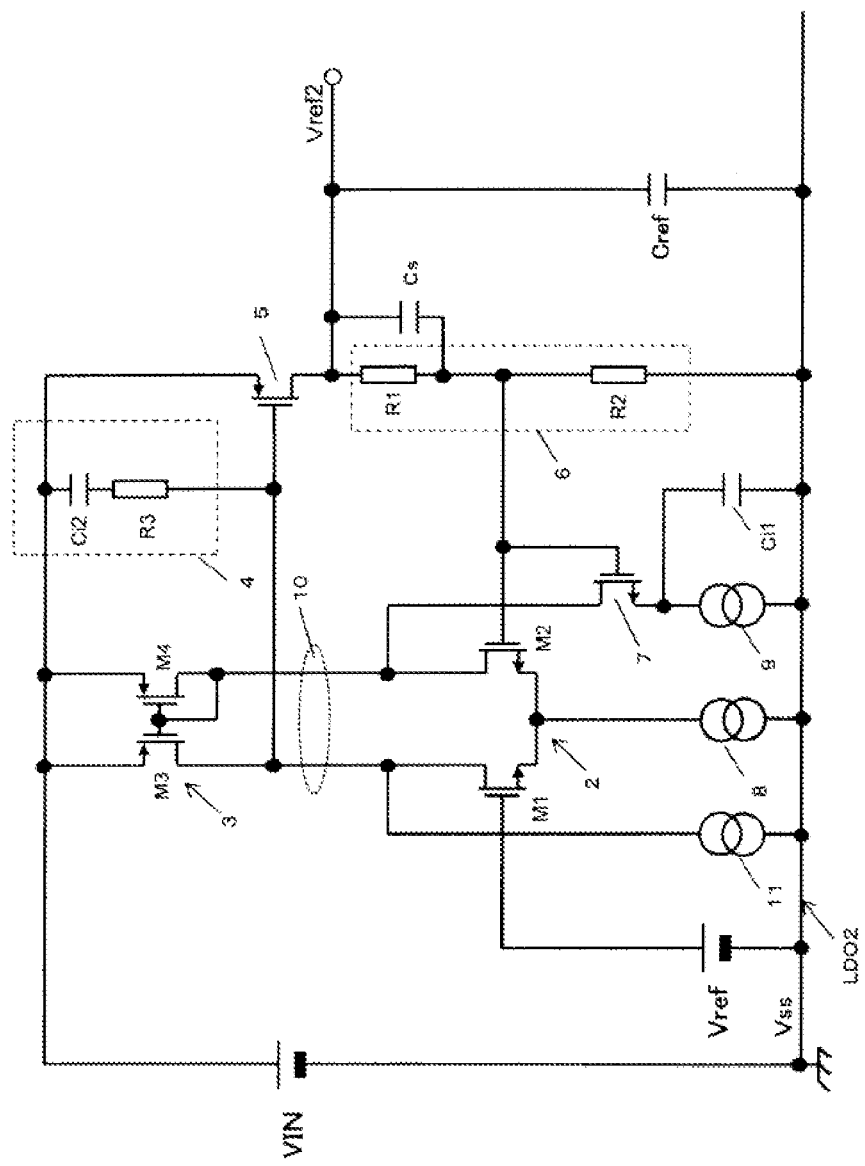
FIG. 10 is a circuit diagram a third example of the second LDO regulator.

FIG. 10 is a circuit diagram showing an internal constitution of a third example of the second LDO regulator LDO2. Since the second LDO regulator LDO2 of FIG. 10 has a constitution in which the connection relation of each constituent component between the input voltage VIN line and the ground line VSS of the first LDO regulator LDO1 of FIG. 9 is basically reversed and the circuit operation is also common, a detailed explanation of the second LDO regulator LDO2 of FIG. 10 is omitted.

(Fourth Example of High-Speed LDO)

In the following fourth example, a transistor similar to the transistor 7 is also installed at the inverted input side of the differential circuit 2 to lower the offset voltage of the first internal reference voltage Vref1.

Figure 11:
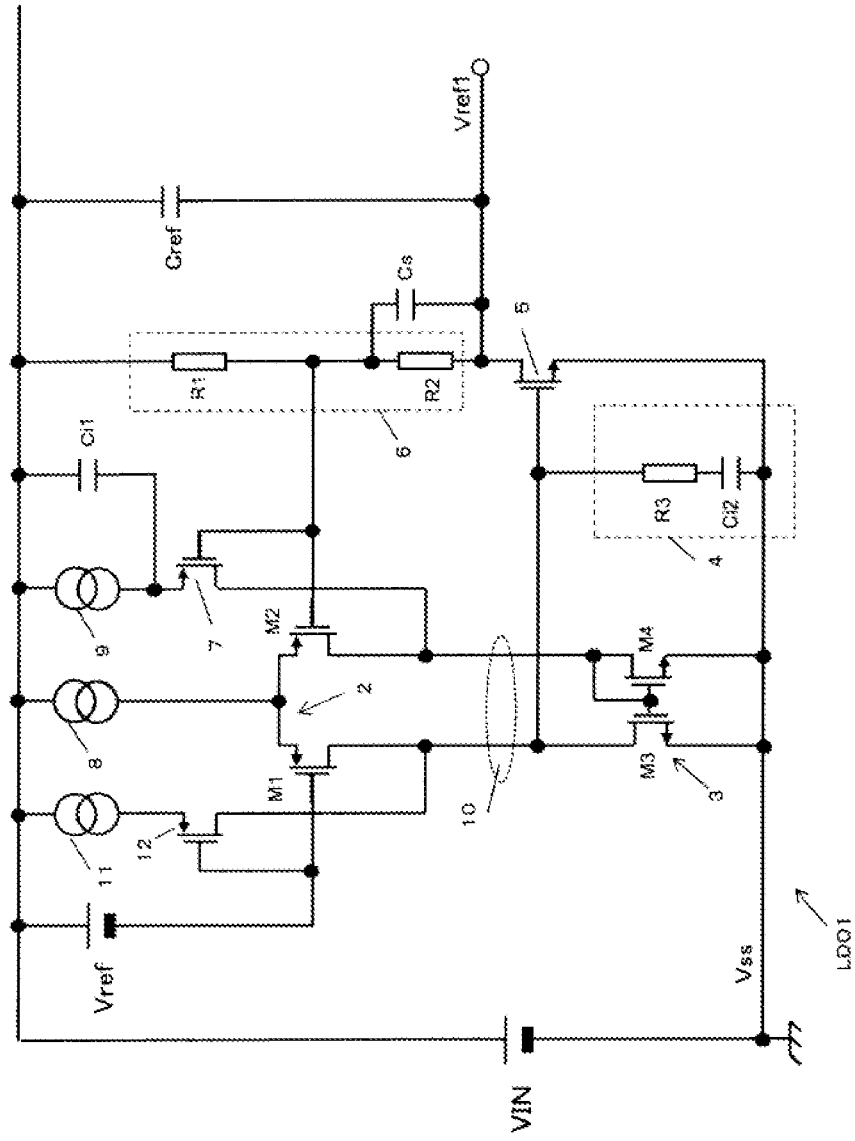
FIG. 11 is a circuit diagram showing a fourth example of the first LDO regulator.

FIG. 11 is a circuit diagram showing an internal constitution of the fourth example of the first LDO regulator LDO1. The first LDO regulator LDO1 of FIG. 11 is provided with the NMOS transistor 12, which is connected between the third current source 11 and the drain of the PMOS transistor M1, in addition to the constitution of FIG. 9. The drain of the NMOS transistor 12 is connected to the drain of the PMOS transistor M1; the source of the NMOS transistor 12 is connected to the third current source 11; and the gate of the NMOS transistor 12 is set to the reference voltage Vref and is also connected to the gate of the PMOS transistor M1.

Since the gate voltage of an NMOS transistor 12 is a reference voltage Vref, the source voltage is a voltage corresponding to the reference voltage Vref, thus allowing for the ability to fix the voltage of the connecting path of the third current source 11 and the NMOS transistor 12. Therefore, the symmetry of the differential circuit 2 is improved, and the offset voltage of the first internal reference voltage Vref1 can be lowered.

In the first LDO regulator LDO1 of FIG. 11, preferably, the electric properties of the second current source 9 and the third current source 11 are the same, and the electric properties of the transistor 7 and the NMOS transistor 12 are also the same.

In addition, in the first LDO regulator LDO1 of FIG. 11, each one end of the output capacitor Cref and the phase compensating capacitor Ci1 may also be connected to a stable voltage circuit with low impedance instead of connecting them to the input voltage VIN line. Moreover, the phase compensating circuit 4 may be omitted.

In FIG. 11, the NMOS transistor 12 has been added to the first LDO regulator LDO1 of FIG. 9, however a symmetric constitution in which the third current source 11 and the NMOS transistor 12 are added to the first LDO regulator LDO1 of FIG. 7 may also be adopted.

Figure 12:
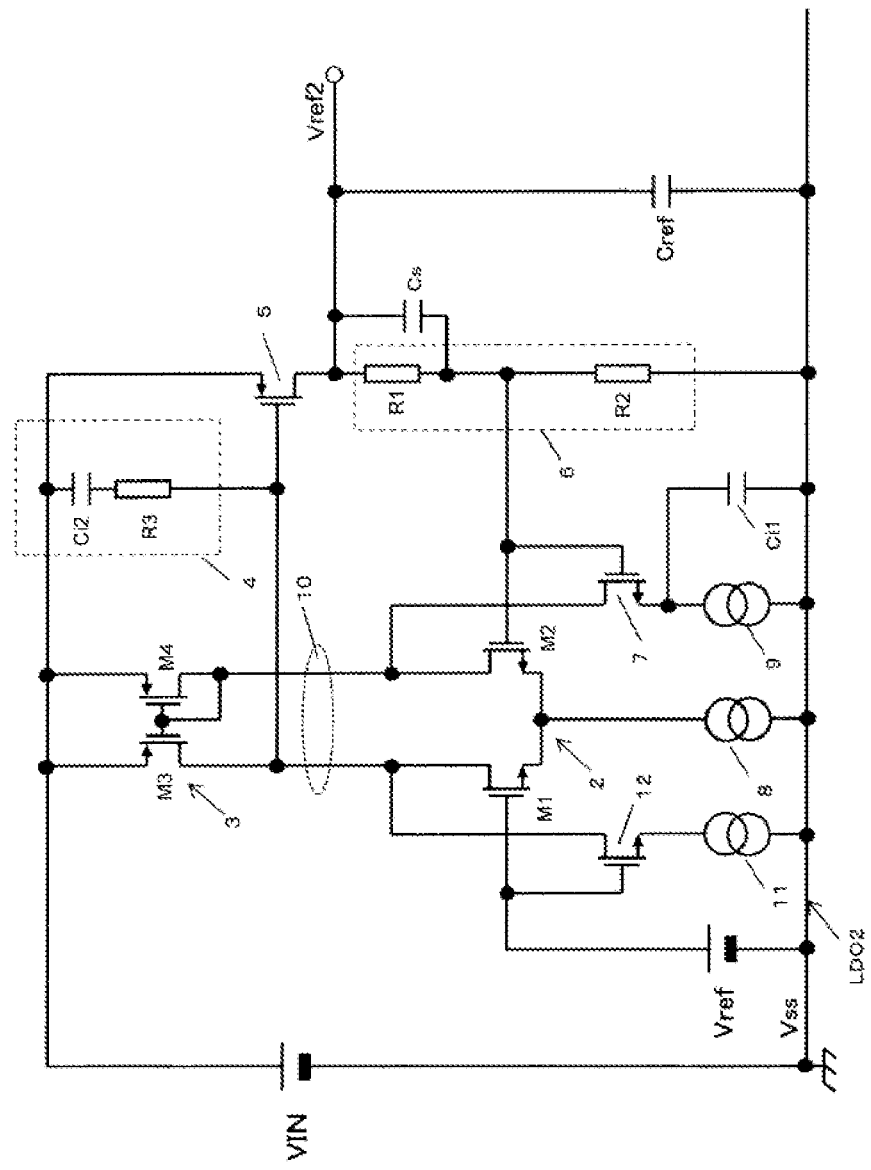
FIG. 12 is a circuit diagram showing a fourth example of the second LDO regulator.

FIG. 12 is a circuit diagram showing an internal constitution of a fourth example of the second LDO regulator LDO2. Since the second LDO regulator LDO2 of FIG. 12 has a constitution in which the connection relation of each constituent component between the input voltage VIN line and the ground line VSS of the first LDO regulator LDO1 of FIG. 11 is basically reversed and the circuit operation is also common, a detailed explanation of the second LDO regulator LDO2 of FIG. 12 is omitted.

(Fifth Example of High-Speed LDO)

In the following fifth example, a phase margin is finely adjusted.

Figure 13:
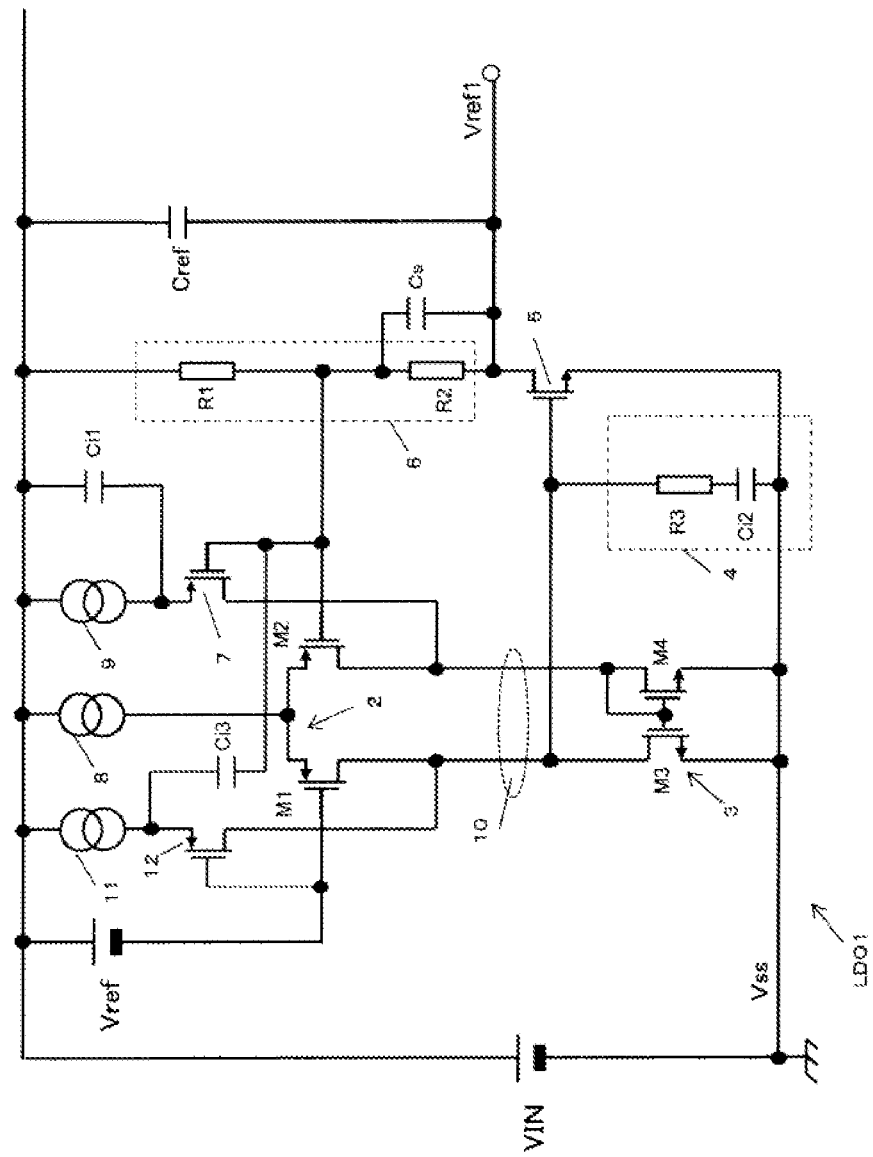
FIG. 13 is a circuit diagram a fifth example of the first LDO regulator.

FIG. 13 is a circuit diagram showing an internal constitution of the fifth example of the first LDO regulator LDO1. In FIG. 13, the same symbols are given to constituent parts common to those of FIG. 11, and in the following, differences will be explained.

The first LDO regulator LDO1 of FIG. 13 is constructed with a phase compensating capacitor (third capacitor) Ci3 that is connected between the gate of the transistor 7 and the source of the NMOS transistor 12 in addition to the constitution of FIG. 11. The capacitance of the capacitor Ci3 is considerably less than the capacitance of the phase compensating capacitor Ci1; for example, it is set to a capacitance value smaller by two digits (orders of magnitude) or more. With the installation of the capacitor Ci3, the phase margin can be finely adjusted.

Figure 14:
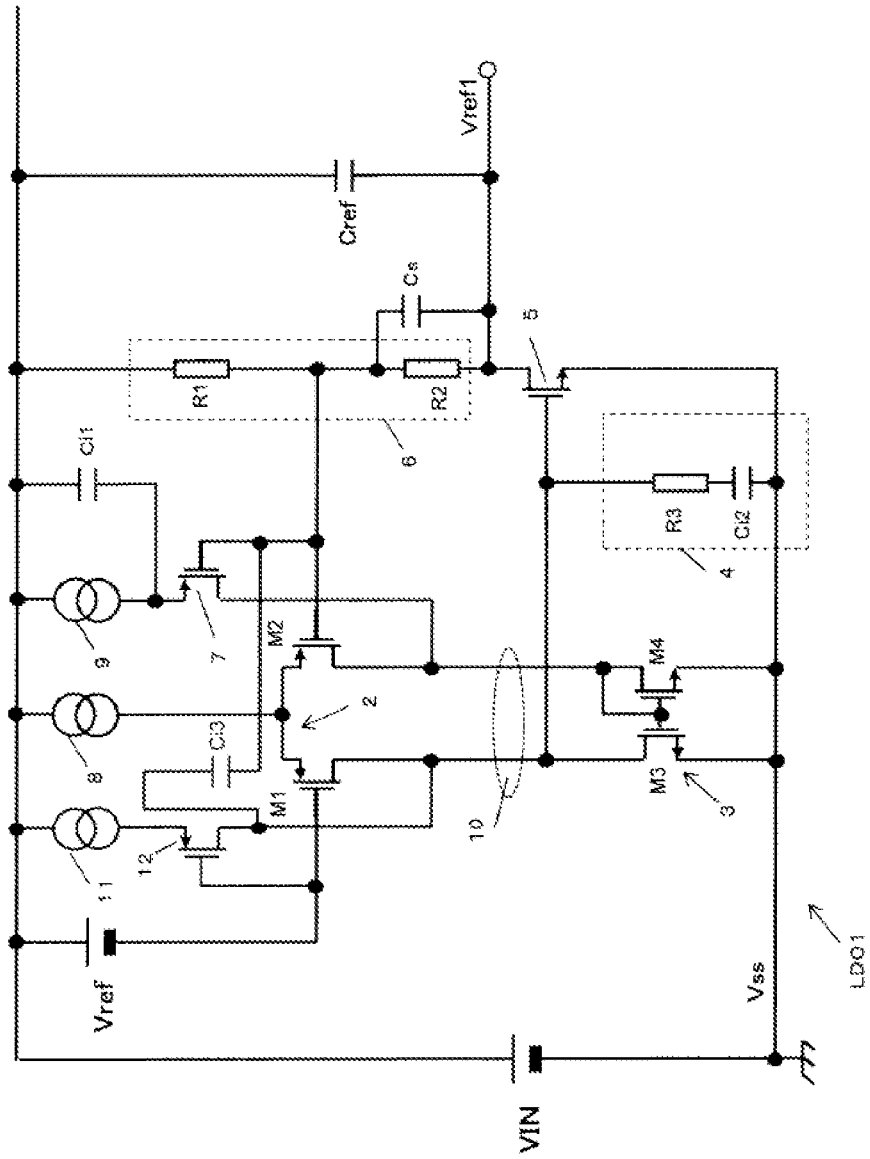
FIG. 14 is a circuit diagram showing a modified example of FIG. 13.

FIG. 14 is a circuit diagram showing a modified example of FIG. 13. One end of the phase compensating capacitor Ci3 is not connected to the source of the NMOS transistor 12 but is connected to the drain. In the case of FIG. 14 and similar to FIG. 13, the phase margin can also be finely adjusted by installing the phase compensating capacitor Ci3.

In the first LDO regulator LDO1 of FIG. 13 and FIG. 14, preferably, the electric properties of the second current source 9 and the third current source 11 are the same, and the electric properties of the transistor 7 and the NMOS transistor 12 are also the same. In addition, each end of the output capacitor Cref and the phase compensating capacitor Ci1 may also be connected to a stable voltage circuit with low impedance instead of being connected to the input voltage VIN line. Moreover, the phase compensating circuit 4 may be omitted.

In FIG. 13 and FIG. 14, the phase compensating capacitor Ci3 has been added to the first LDO regulator LDO1 of FIG. 5; however, the phase compensating capacitor Ci3 for fine adjustment of a phase margin may also be added to all of the first LDO regulators LDO1 having the third current source 11.

Figure 15:
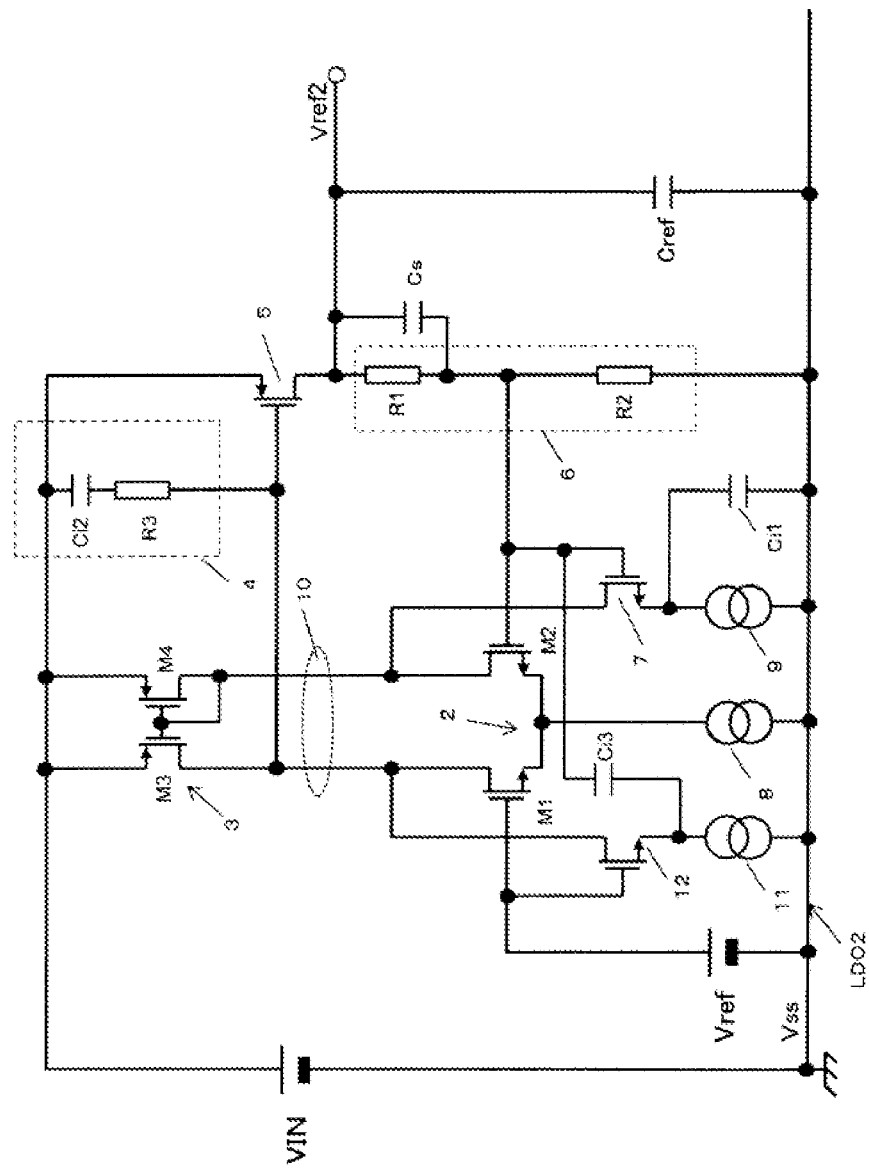
FIG. 15 is a circuit diagram showing the connection relation of each constituent component between an input voltage VIN line and a ground line of FIG. 13 in reverse.
Figure 16:
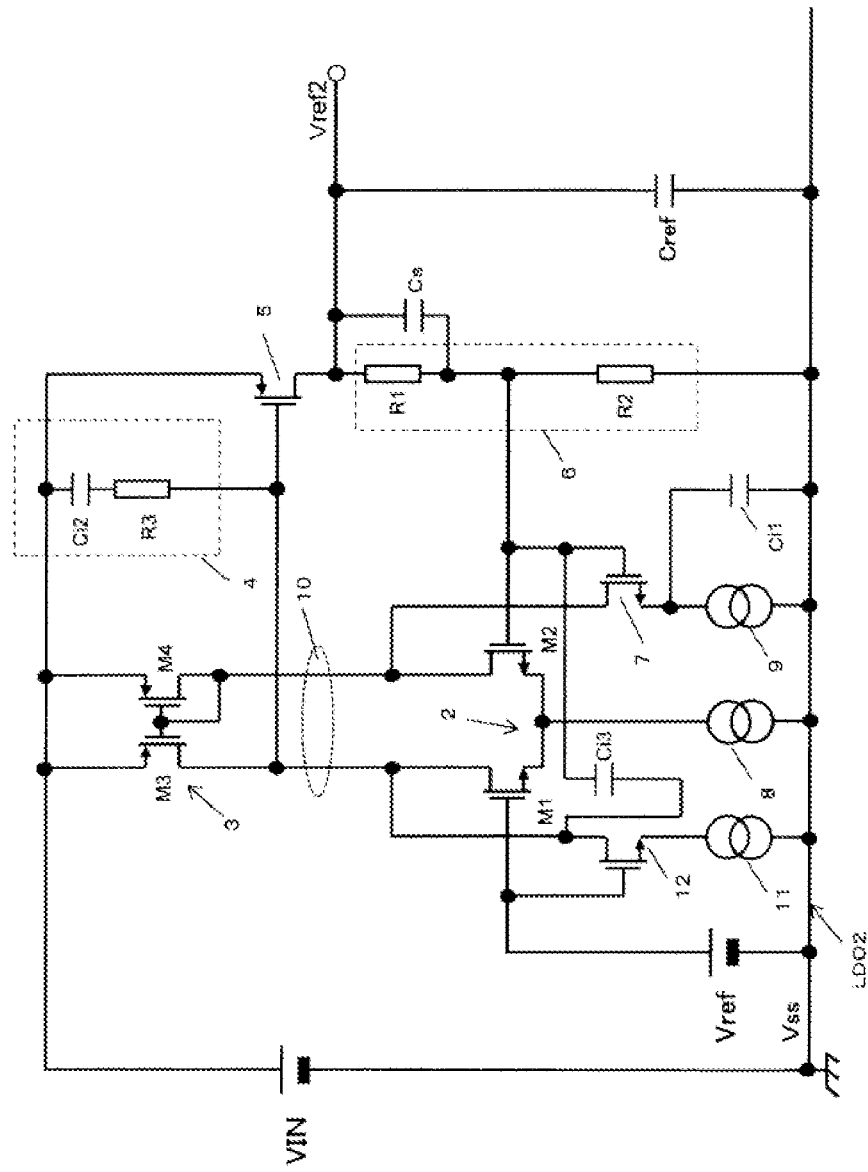
FIG. 16 is a circuit diagram showing the connection relation of each constituent component between an input voltage VIN line and a ground line of FIG. 14 in reverse.

FIG. 15 and FIG. 16 are circuit diagrams showing an internal constitution of a fifth example of the second LDO regulator LDO2. FIG. 15 shows a circuit in which the connection relation of each constituent component between the input voltage VIN line and the ground line VSS of FIG. 13 is reversed, and FIG. 16 shows a circuit in which the connection relation of each constituent component between the input voltage VIN line and the ground line VSS of FIG. 14 is reversed. Since the circuit operations of the second LDO regulator LDO2 of FIG. 15 and FIG. 16 are common to the circuit operations of the first LDO regulator LDO1 of FIG. 13 and FIG. 14 are common, their detailed explanation is omitted.

(Sixth Example of High-Speed LDO)

The following sixth example has a constitution in which the differential circuit 2 is a folded cascade type.

In the first LDO regulators LDO1 of the respective example, an example in which the differential circuit 2 including a pair of PMOS transistors M1 and M2 has been shown. However, if the input voltage VIN is a low voltage of 1.5 V or lower, the reference voltage Vref is also lowered, thus preventing the ability to use an NMOS transistor in the differential circuit 2. In this case, constituting the differential circuit 2 in a folded cascade type and installing a pair of PMOS transistors M1 and M2 is an option.

Figure 17:
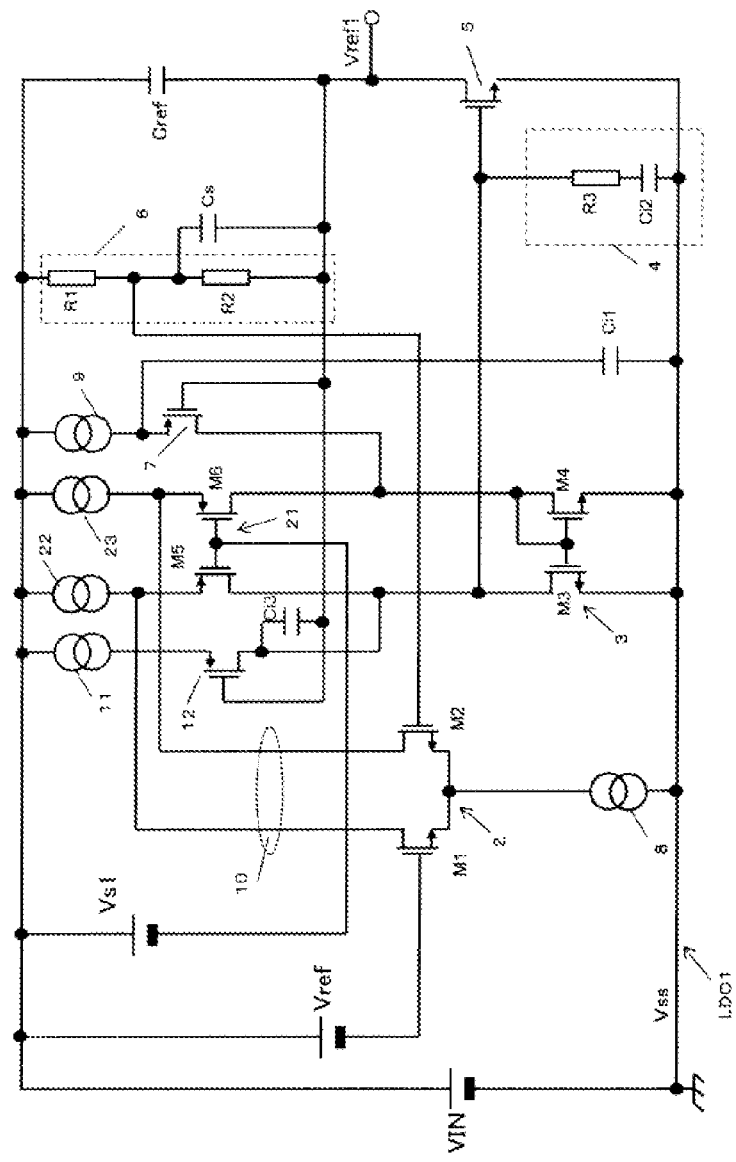
FIG. 17 is a circuit diagram showing a sixth example of the first LDO regulator.

FIG. 17 is a circuit diagram showing an internal constitution of the sixth example of the first LDO regulator LDO1. In FIG. 17, the same symbols are given to constituent parts common to those of FIG. 7, and in the following, differences will be explained.

The differential circuit 2 of the first LDO regulator LDO1 of FIG. 17 has a folded cascade type constitution and includes a pair of NMOS transistors M1 and M2. Between the differential circuit 2 and the first current mirror circuit 3 including a pair of NMOS transistors M3 and M4, a second current mirror circuit 21 including a pair of PMOS transistors M5 and M6 is connected. Fourth and fifth current sources 22 and 23 are connected to the pair of differential output lines 10 of the second current mirror circuit 21.

Between one of the pair of differential output lines 10 between the first and second current mirror circuits 3 and 21 and the input voltage VIN line, the transistor 7 and the second current source 9 are connected in series, and the phase compensating capacitor Ci1 is connected in parallel with the second current source 9.

The NMOS transistor 12 and the third current source 11 are connected in series between the other of the pair of differential output lines 10 and the ground line Vss, and the phase compensating capacitor Ci3 for fine adjustment of a phase margin is connected between the drain of the NMOS transistor 12 and the first internal reference voltage Vref1 line.

Since the pair of NMOS transistors M1 and M2 is installed in the differential circuit 2, even if the reference voltage Vref is a constant voltage of about 1.2 V, a comparison operation can be carried out without a problem, thus being able to generate the first internal reference voltage Vref1 of a low voltage.

One end of the second to fifth current sources 9, 11, 22, and 23, one end of the phase compensating capacitor Ci1, one end of the current dividing circuit 6, and one end of the output capacitor Cref are connected to the input voltage VIN line. In addition, any of one end of the first current source 8, one end of the first current mirror circuit 3, one end of the phase compensating circuit 4, and the source of the output transistor 5 are connected to the ground line VSS.

Figure 18:
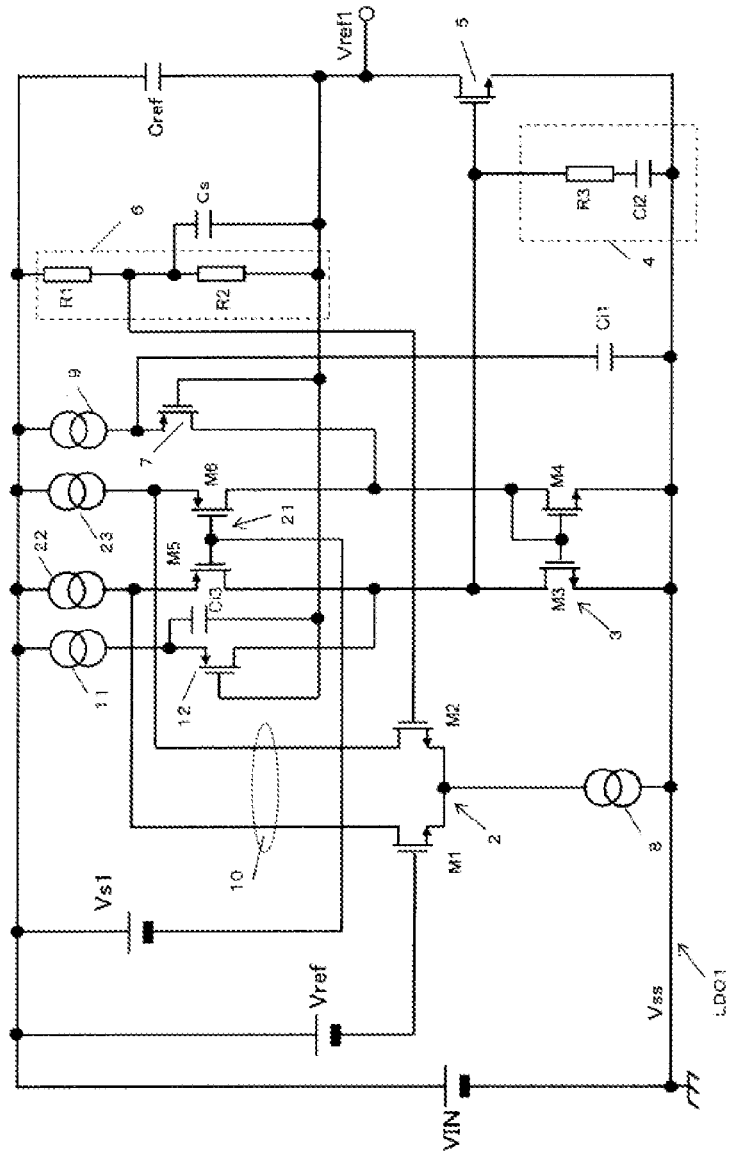
FIG. 18 is a circuit diagram showing a modified example of FIG. 17.

FIG. 18 is a circuit diagram showing a modified example of FIG. 17. The first LDO regulator LDO1 of FIG. 18 is characterized in that one end of the phase compensating capacitor Ci3 for fine adjustment of a phase margin is not connected to the drain of the NMOS transistor 12 but is connected to the source.

Since the first LDO regulator LDO1 of FIG. 18 also has a folded cascade-type constitution similar to that of FIG. 17, even if the input voltage VIN is a low voltage, the regulator can be stably operated.

In the first LDO regulator LDO1 of FIG. 17 and FIG. 18, preferably, the electric properties of the second current source 9 and the third current source 11 are the same; the electric properties of the fourth current source 22 and the fifth current source 23 are the same; and the electric properties of the transistor 7 and the NMOS transistor 12 are the same. In addition, each end of the output capacitor Cref and the phase compensating capacitor Ci1 may also be connected to a stable voltage circuit with low impedance instead of connecting them to the input voltage VIN line. Moreover, the phase compensating circuit 4 may be omitted.

The first LDO regulator LDO1 of FIG. 17 and FIG. 18 is provided with the phase compensating capacitor Ci3 for fine adjustment of a phase margin; however, the phase compensating capacitor may also be omitted.

Figure 19:
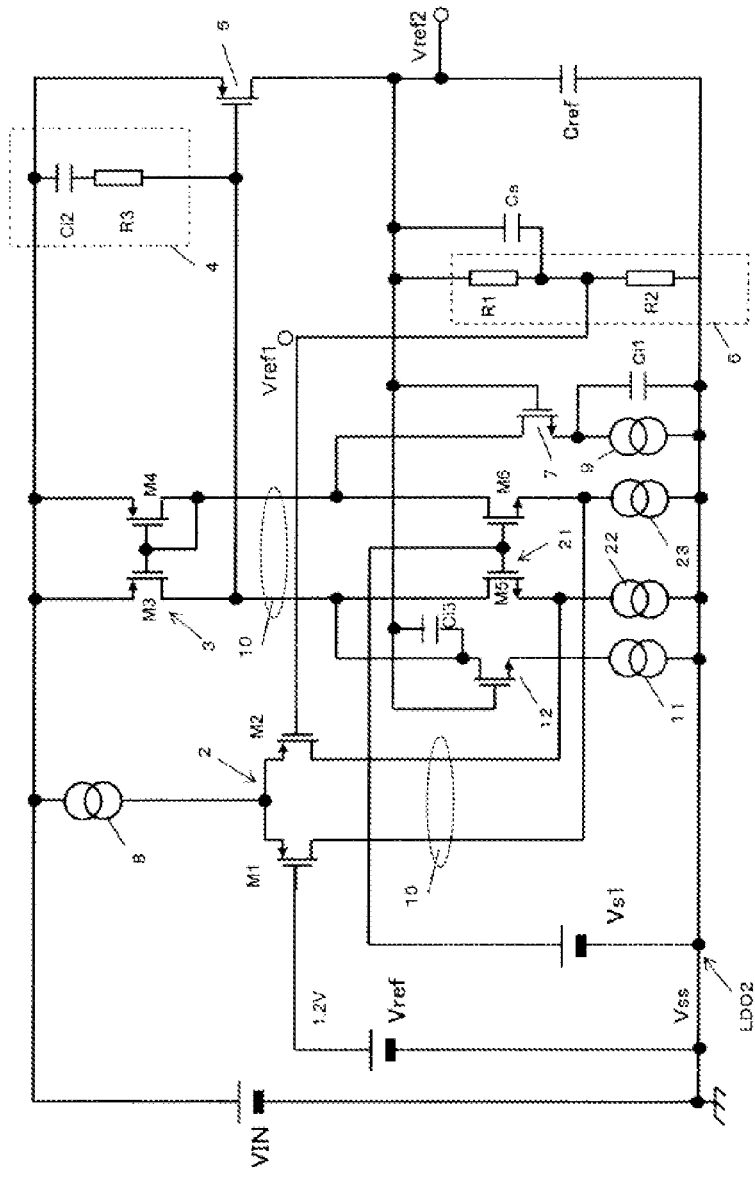
FIG. 19 is a circuit diagram showing the connection relation of each constituent component between an input voltage VIN line and a ground line of FIG. 17 in reverse.
Figure 20:
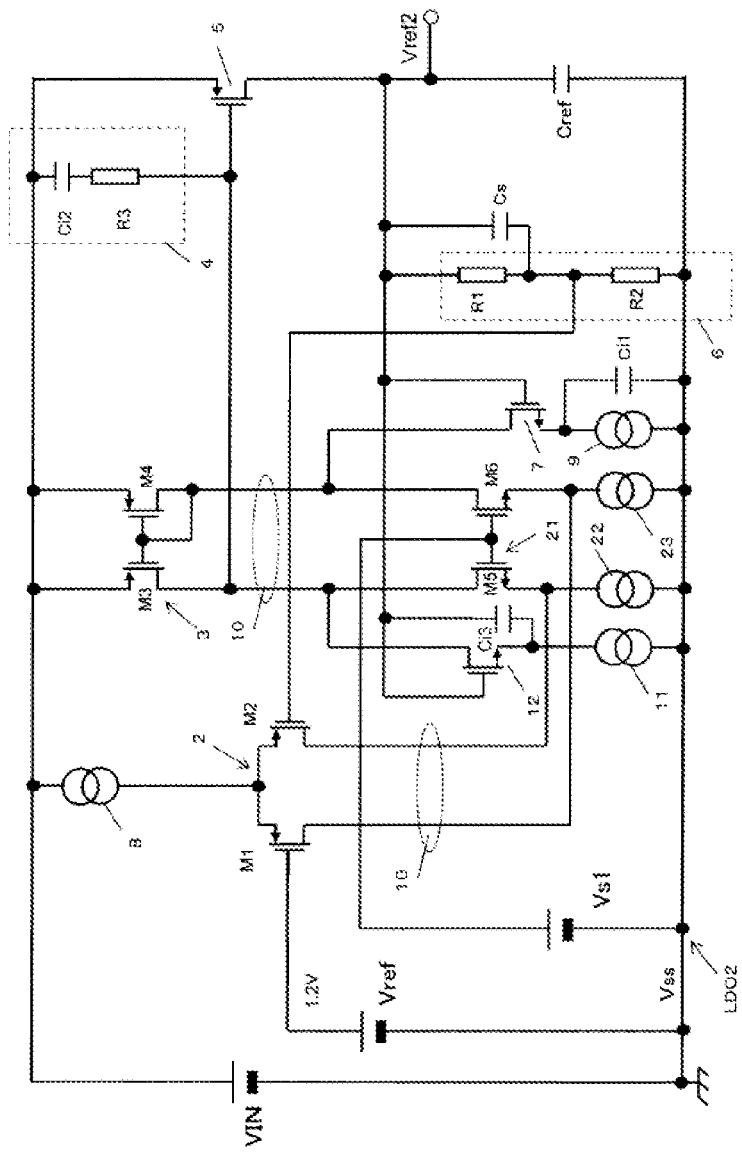
FIG. 20 is a circuit diagram showing the connection relation of each constituent component between an input voltage VIN line and a ground line of FIG. 18 in reverse.

FIG. 19 and FIG. 20 are circuit diagrams showing an internal constitution of a sixth example of the second LDO regulator LDO2. FIG. 19 shows a circuit in which the connection relation of each constituent component between the input voltage VIN line and the ground line VSS of FIG. 17 is reversed, and FIG. 20 shows a circuit in which the connection relation of each constituent component between the input voltage VIN line and the ground line VSS of FIG. 18 is reversed. Since the circuit operations of the second LDO regulator LDO2 of FIG. 19 and FIG. 20 are common to the circuit operations of the first LDO regulator LDO1 of FIG. 17 and FIG. 18, their detailed explanation is omitted.

(Seventh Example of High-Speed LDO)

In the following seventh example, a low-voltage side reference voltage for the first LDO regulator LDO1 is set to a negative voltage.

Figure 21:
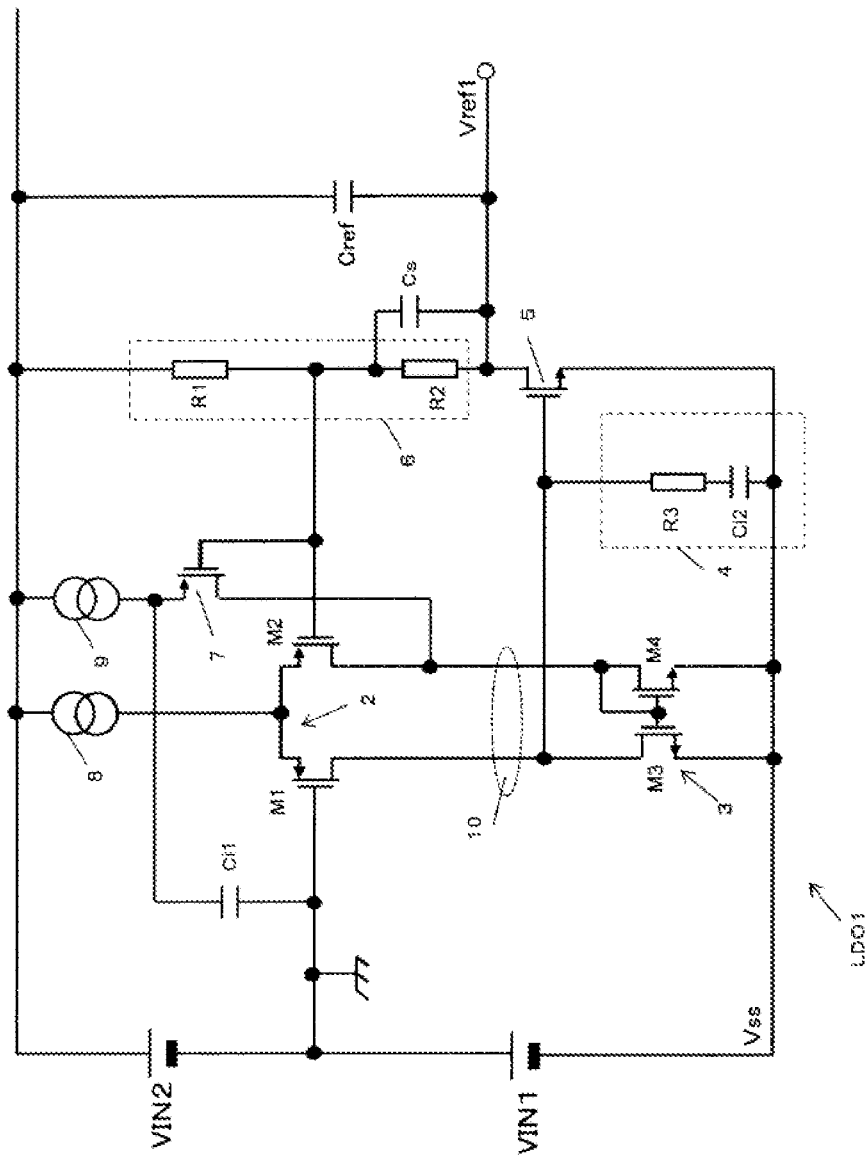
FIG. 21 is a circuit diagram showing an eighth example of the first LDO regulator.

FIG. 21 is a circuit diagram showing the seventh example of the first LDO regulator LDO1. The first LDO regulator LDO1 of FIG. 21 is similar to the circuit constitution of FIG. 2; however, the low-voltage side reference voltage is not a ground voltage but is a negative voltage (=−VIN1).

In the first LDO regulator LDO1 of FIG. 21, two kinds of input voltages VIN1 and VIN2 are input; while one of the input voltages is a high-voltage side input voltage VIN2 line, the other is a low-voltage side input voltage line (=−VIN1).

The first current source 8 is connected between the differential circuit 2 including the pair of PMOS transistors M1 and M2 and the positive input voltage VIN2 line; additionally, the transistor 7 and the second current source 9 are connected in series between the drain of the PMOS transistor M2 and the positive input voltage VIN2 line. The voltage-dividing circuit 6 is connected between the first internal reference voltage Vref1 line and the positive input voltage VIN2 line. Moreover, the phase compensating capacitor Ci1 is connected between the source of the transistor 7 and the gate of the PMOS transistor M1.

Figure 22:
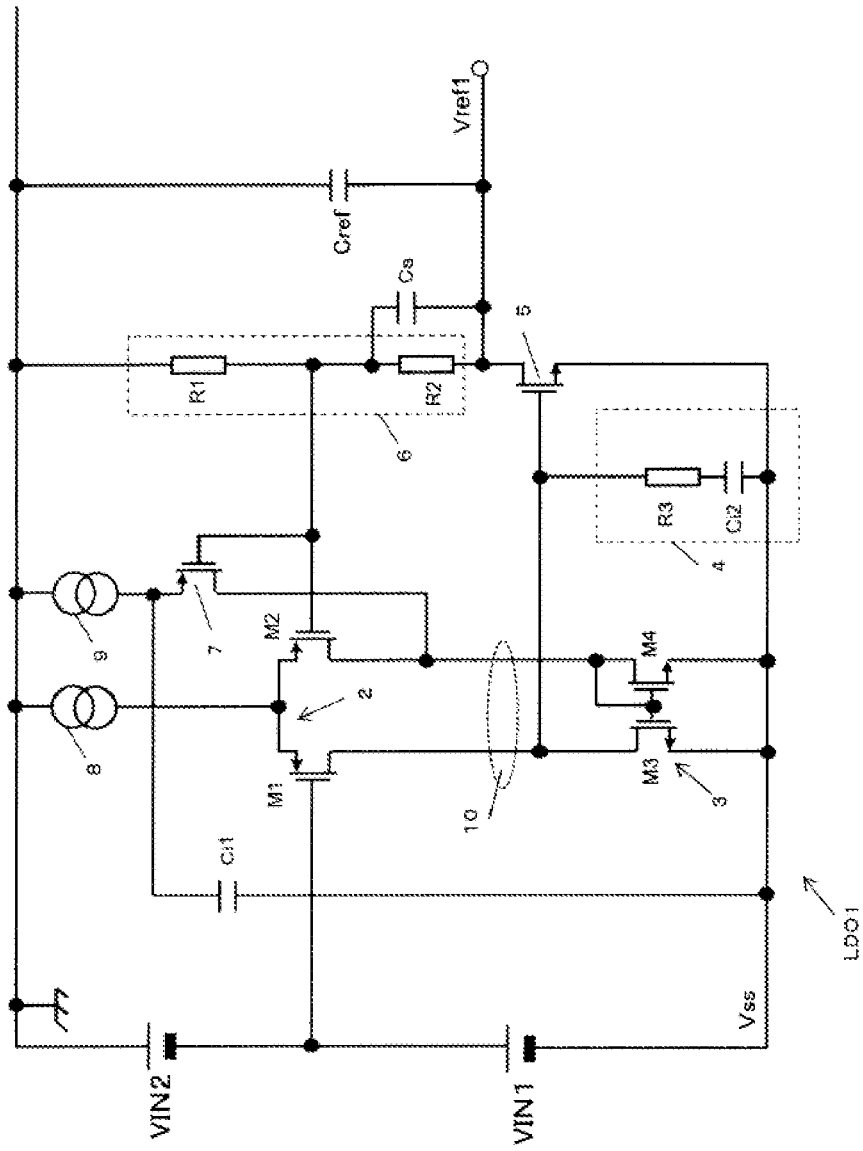
FIG. 22 is a circuit diagram showing a modified example of FIG. 21.

FIG. 22 is a circuit diagram showing a modified example of FIG. 21. The first LDO regular LDO1 of FIG. 22 is different from that of FIG. 21 in that one end of the phase compensating capacitor Ci1 is not connected to the gate of the transistor 6 but is connected to a negative input voltage line (=−VIN1) and in that the negative input voltage line is set to a ground voltage level.

The voltage level of the negative input voltage line of the first LDO regulator LDO1 of FIG. 22 is −(VIN1+VIN2), and this regulator is operated at a voltage lower than that of FIG. 21.

The first LDO regulators LDO1 of FIG. 21 and FIG. 22 are operated similarly to the first LDO regulator LDO1 of FIG. 2 except that the voltage level of the negative input voltage line is set to a negative voltage lower than the ground voltage.

In the first LDO regulators LDO1 of FIG. 21 and FIG. 22, the voltage of a negative electrode of the output capacitor Cref and the phase compensating capacitor Ci1 may be connected to a stable voltage path with low impedance instead of setting it to the voltage shown in FIG. 21 and FIG. 22. In addition, the phase compensating circuit 4 may also be omitted.

In FIG. 21 and FIG. 22, the gate of the transistor 7 may also be connected to the first internal reference voltage Vref1 line. In addition, in FIG. 21 and FIG. 22, a third current line 11 may also be added to form a symmetric constitution similar to FIG. 9. Moreover, to further raise the symmetry, the NMOS transistor 12 may also be added as it is in FIG. 11. Furthermore, in FIG. 21 and FIG. 22, the phase compensating capacitor Ci3, like FIG. 13 or FIG. 14, may also be added.

Figure 23:
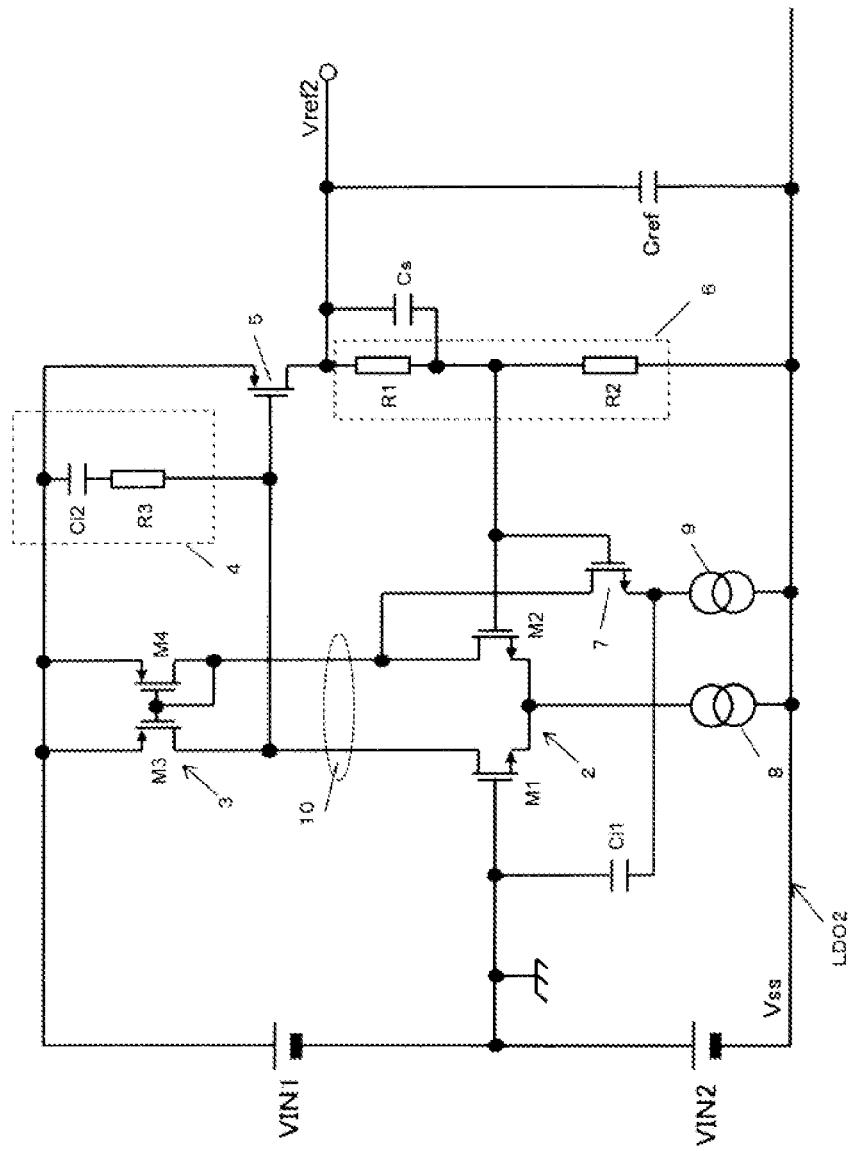
FIG. 23 is a circuit diagram the connection relation of each constituent component between an input voltage VIN line and a ground line of FIG. 21 in reverse.
Figure 24:
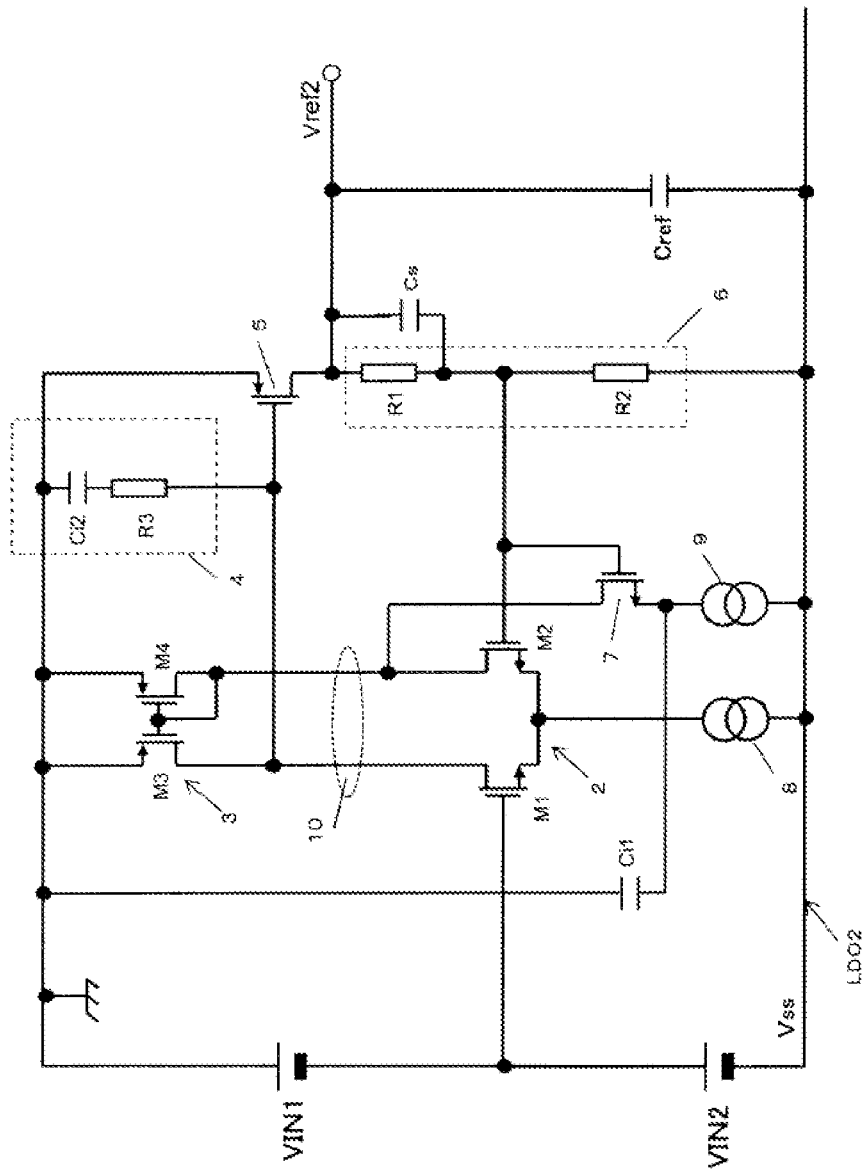
FIG. 24 is a circuit diagram showing the connection relation of each constituent component between an input voltage VIN line and a ground line of FIG. 22 in reverse.

FIG. 23 and FIG. 24 are circuit diagrams showing an internal constitution of a seventh example of the second LDO regulator LDO2. FIG. 23 shows a circuit in which the connection relation of each constituent component between the input voltage VIN line and the ground line VSS of FIG. 21 is reversed, and FIG. 24 shows a circuit in which the connection relation of each constituent component between the input voltage VIN line and the ground line VSS of FIG. 22 is reversed. Since the circuit operation of the second LDO regulator LDO2 of FIG. 23 and FIG. 24 is common to the circuit operation of the first LDO regulator LDO1 of FIG. 21 and FIG. 22, its detailed explanation is omitted.

(Eighth Example of High-Speed LOD)

In the following ninth example, the conductivity of the transistor 7 in the first example is reversed.

Figure 25:
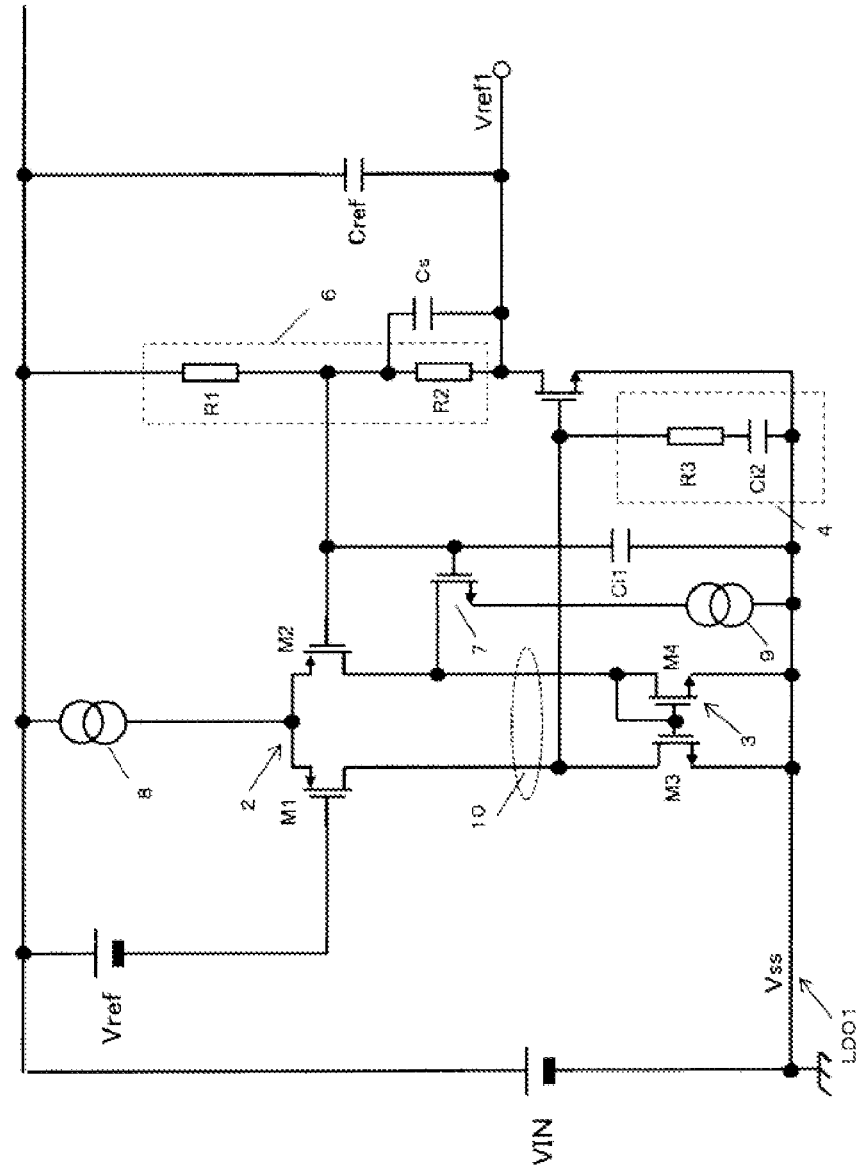
FIG. 25 is a circuit diagram showing a ninth example of the first LDO regulator.

FIG. 25 is a circuit diagram showing the ninth example of the first LDO regulator LDO1. In the first LDO regulator LDO1 of FIG. 25, the connection pattern of the transistor 7, second current source 9, and phase compensating capacitor Ci1 is different from that of the first LDO regulator LDO1 of FIG. 3. The transistor 7 of FIG. 25 is an NMOS transistor, and the second current line 9 is connected between its source and the ground line VSS, and the phase compensating capacitor Ci1 is connected between its gate and the ground line Vss.

Therefore, even in case the transistor 7 is constituted by the NMOS transistor, a wide band can be realized similar to as in FIG. 4.

In the first LDO regulator LDO1 of FIG. 25, similar to FIG. 4, for offset adjustment, it is desirable to change the size ratio of the transistors M1 and M2 or to change the size ratio of the pair of transistors M3 and M4 in the current mirror circuit 3.

In addition, in the first LDO regulator LDO1 of FIG. 25, instead of connecting one end of the output capacitor Cref to the input voltage VIN line and connecting one end of the phase compensating capacitor Ci1 to the ground line Vss, they may also be connected to a stable voltage circuit with low impedance. Moreover, the phase compensating circuit 4 may be omitted.

Similarly, the transistor 5 including an NMOS transistor explained in the respective embodiments can also be substituted by a PMOS transistor.

Figure 26:
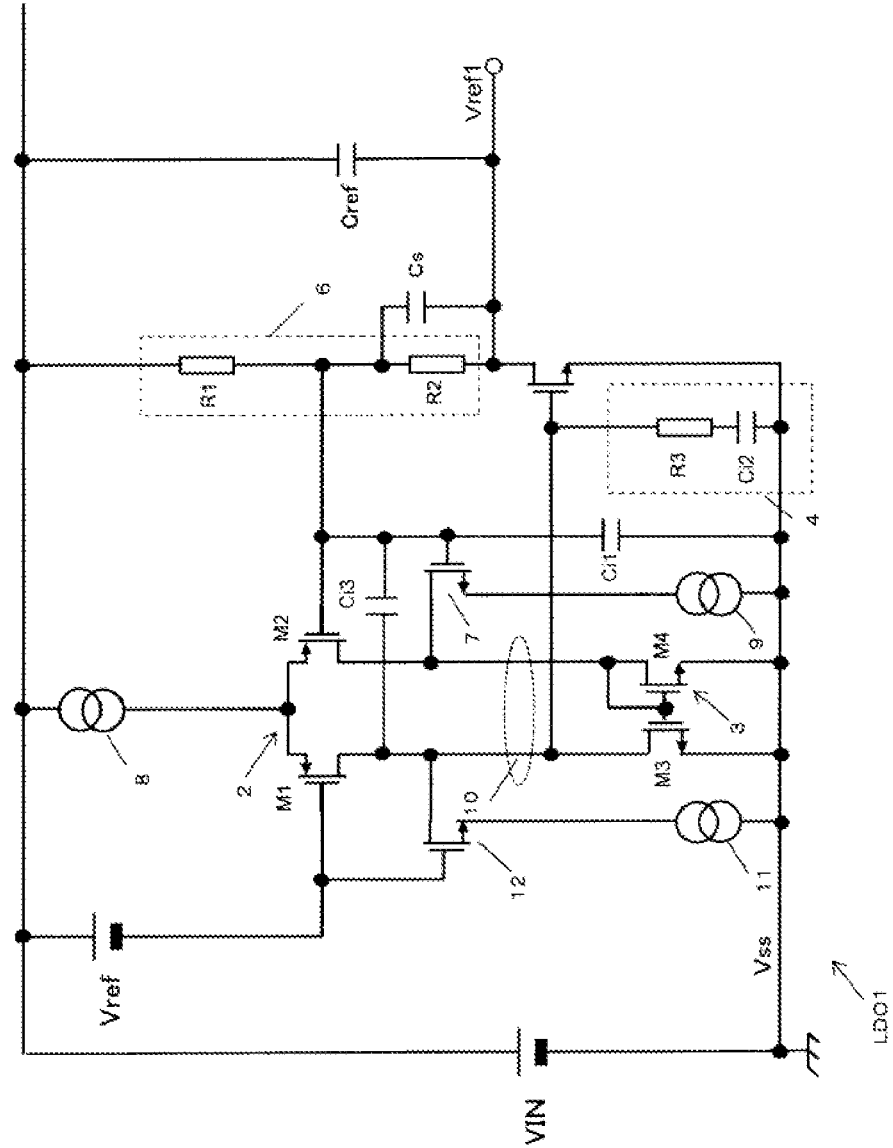
FIG. 26 is a circuit diagram showing a modified example of FIG. 6.

FIG. 26 is a circuit diagram showing a modified example of FIG. 6. The first LDO regulator LDO1 of FIG. 26 is constructed with the second current source 9 and the transistor 7 that are connected in series between the ground line VSS and the drain of the PMOS transistor M2; the third current source 11 and the PMOS transistor 12 that are connected in series between the ground line VSS and the gate of the PMOS transistor M1; and the phase compensating capacitor Ci3 that is connected between the drain of the PMOS transistor M1 and the gate of the PMOS transistor M2. The gate of the transistor 7 is connected to the gate of the PMOS transistor M2, and the gate of the PMOS transistor 12 is connected to the gate of the PMOS transistor M1.

In the first LDO regulator LDO1 of FIG. 26, preferably, the electric properties of the second current source 9 and the third current source 11 are the same, and the electric properties of the transistor 7 and the NMOS transistor 12 are also the same. In addition, each end of the output capacitor Cref and the phase compensating capacitor Ci1 may also be connected to a stable voltage circuit with low impedance instead of connecting them to the ground line Vss. Moreover, the phase compensating circuit 4 may be omitted.

In FIG. 25 and FIG. 26, the gate of the transistor 7 may also be connected to the first internal reference voltage Vref1 line. In addition, the PMOS transistor 12 may be omitted in FIG. 26. Moreover, in FIG. 26, the connecting position of the phase compensating capacitor Ci3 is not limited the position shown in the figure, and the phase compensating capacitor Ci3 may also be added to FIG. 25.

Figure 27:
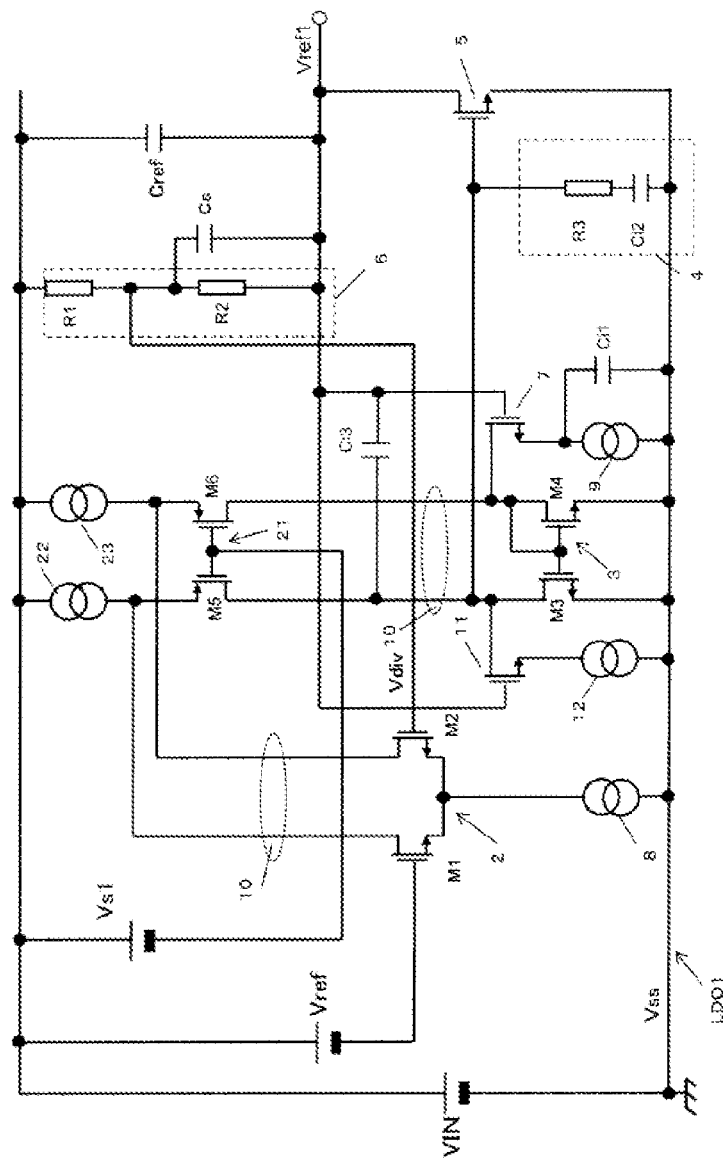
FIG. 27 is a circuit diagram showing a modified example of FIG. 8.

FIG. 27 is a circuit diagram showing a modified example of FIG. 8. The first LDO regulator LDO1 of FIG. 27 has a folded cascade type constitution. The second current source 9 and the transistor 7 are connected in series between the input voltage VIN line and the drain of the PMOS transistor M4; the third current source 11 and the PMOS transistor 12 are connected in series between the ground line VSS and the drain of the PMOS transistor M3; the phase compensating capacitor Ci1 is connected between the source of the transistor 7 and the ground Vss; and the capacitor Ci3 is connected between the drain of the PMOS transistor M3 and the gate of the transistor 7.

In the first LDO regulator LDO1 of FIG. 27, preferably, the electric properties of the second current source 9 and the third current source 11 are the same, the electric properties of the fourth current source 22 and the fifth current source 23 are the same, and the electric properties of the transistor 7 and the NMOS transistor 12 are the same. In addition, one end of the phase compensating capacitor Ci1 may also be connected to a stable voltage circuit with low impedance instead of connecting it to the ground line Vss. Moreover, the phase compensating circuit 4 may be omitted.

Figure 28:
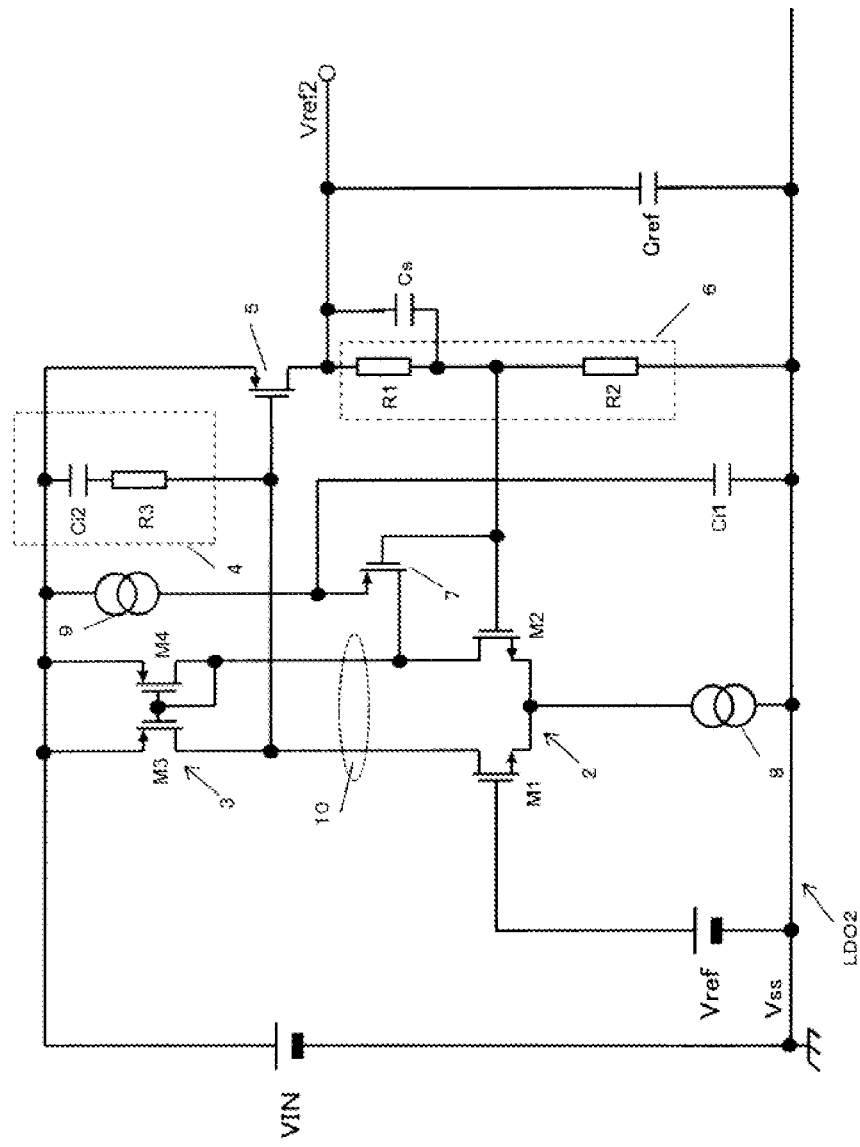
FIG. 28 is a circuit diagram showing the connection relation of each constituent component between an input voltage VIN line and a ground line of FIG. 25 in reverse.
Figure 29:
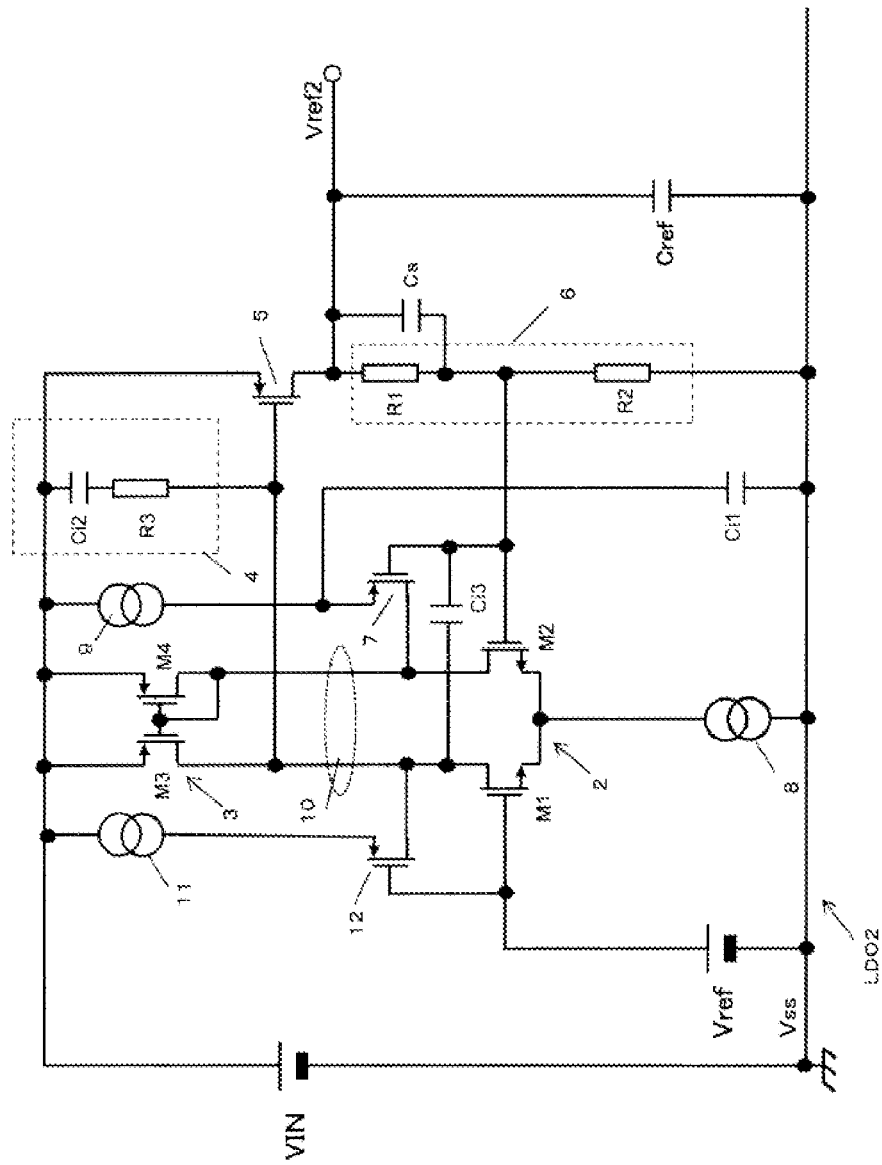
FIG. 29 is a circuit diagram showing the connection relation of each constituent component between an input voltage VIN line and a ground line of FIG. 26 in reverse.
Figure 30:
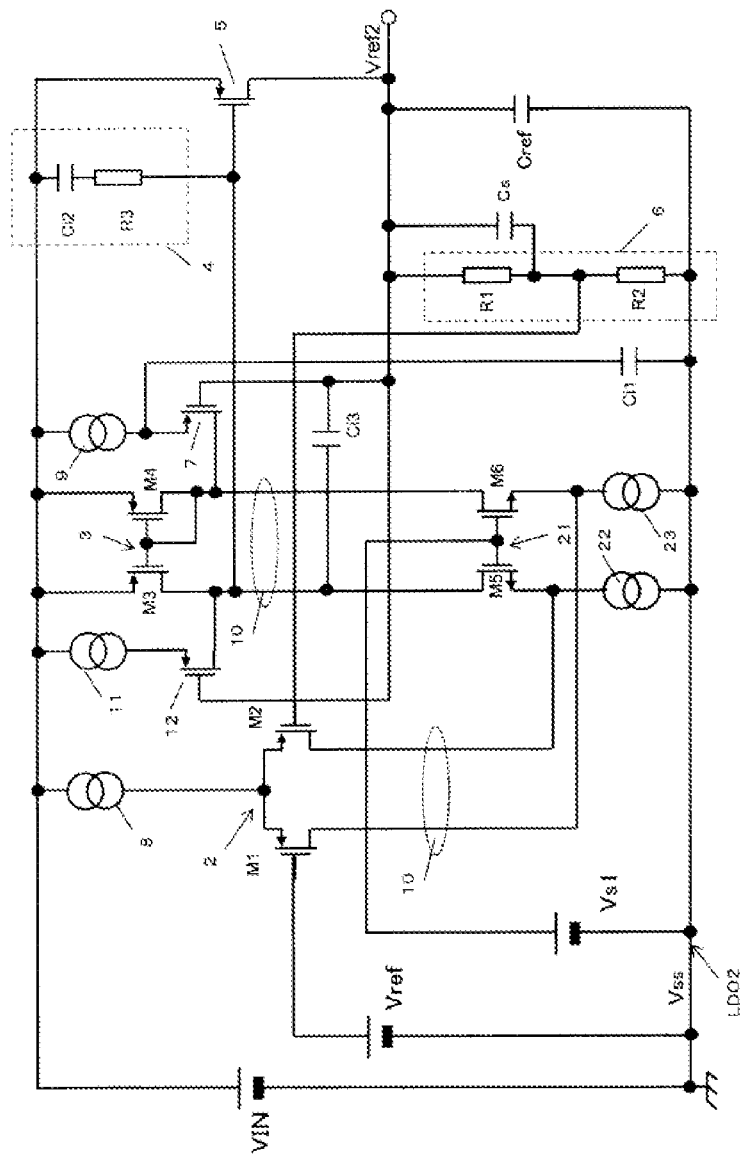
FIG. 30 is a circuit diagram showing the connection relation of each constituent component between an input voltage VIN line and a ground line of FIG. 27 in reverse.

The second LDO regulator LDO2 of FIG. 28 to FIG. 30 are circuit diagrams showing an internal constitution of a seventh example of the second LDO regulator LDO2. FIG. 28 shows a circuit in which the connection relation of each constituent component between the input voltage VIN line and the ground line VSS of FIG. 25 is reversed; FIG. 29 shows a circuit in which the connection relation of each constituent component between the input voltage VIN line and the ground line VSS of FIG. 26 is reversed and FIG. 30 shows a circuit in which the connection relation of each constituent component between the input voltage VIN line and the ground line VSS of FIG. 27 is reversed. Since the circuit operations of the second LDO regulators LDO2 of FIG. 28 to FIG. 30 are common to the circuit operations of the first LDO regulators LDO1 of FIG. 25 to FIG. 27, their detailed explanation is omitted.

In the second LDO regulator LDO2 of FIG. 29, preferably, the electric properties of the second current source 9 and the third current source 11 are the same, and the electric properties of the transistor 7 and the PMOS transistor are the same. In addition, each one end of the output capacitor Cref and the phase compensating capacitor Ci1 may also be connected to a stable voltage circuit with low impedance instead of connecting them to the input voltage VIN line or the ground line Vss. Moreover, the phase compensating circuit 4 may be omitted.

The second LDO regulator LDO2 of FIG. 30 is provided with the transistor 7 and the second current source 9 that are connected in series between the drain of the NMOS transistor M4 in the second current mirror circuit 21 and the input voltage VIN line; the phase compensating capacitor Ci1 that is connected in parallel with the second current source 9; the NMOS transistor 12 and the third current source 11 that are connected in series between the drain of the NMOS transistor M3 and the input voltage VIN line; and the capacitor Ci3 that is connected between the drain of the NMOS transistor 12 and the gate of the transistor 7.

In the second LDO regulator LDO2 of FIG. 30, preferably, the electric properties of the second current source 9 and the third current source 11 are the same, the electric properties of the fourth current source 22 and the fifth current source 23 are the same, and the electric properties of the transistor 7 and the NMOS transistor 12 are the same. In addition, each end of the output capacitor Cref and the phase compensating capacitor Ci1 may also be connected to a stable voltage circuit with low impedance instead of connecting them to the ground line Vss. Moreover, the phase compensating circuit 4 may be omitted.

In FIG. 29, the PMOS transistor 12 may be omitted, and the third current source 11 may also be omitted. In addition, in FIG. 29, the gate of the transistor 7 may be connected to the first internal reference voltage Vref1 line. Moreover, in FIG. 27 to FIG. 30, the phase compensating capacitor Ci3 may be omitted, and the connecting position of the phase compensating capacitor Ci3 is not limited to that shown in the figure.

Since the second to ninth examples, which are similar to the first example, are provided with the transistor 7, second power source 9, and phase compensating capacitor Ci1, a high-frequency signal overlapped with the first internal referenced voltage Vref1 can be quickly amplified, therefore, a wide band can be realized and a ceramic capacitor can be used in the output capacitor Cref.

In the first LDO regulator LDO1 and the second LDO regulator LDO2 of the respective examples, an example in which all the transistors are constituted by MOS transistors on the assumption of the formation of a chip has been explained, however each embodiment can also be constituted by bipolar transistors.

In the first LDO regulator LDO1 and the second LDO regulator LDO2 of the respective examples, the divided voltage Vdiv in which the first internal reference voltage Vref is divided by the voltage dividing circuit 6 that is fed back to the differential circuit 2. However, the voltage dividing circuit 6 is not an essential constitution, and the first internal reference voltage Vref1 may also be directly fed back to the differential circuit 2. In this case, the first internal reference voltage Vref1 is input into each gate of the transistor M2 and the transistor 7 in the differential circuit 2. In other words, the voltage correlated to the first internal reference voltage Vref1 may be applied to each gate of the transistor M2 and the transistor 7 in the differential circuit 2.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A DC-DC converter, comprising:
   a first circuit supplied with a first internal reference voltage and a first power supply voltage and configured to supply current to a first terminal of an inductor;
   a first regulator configured to generate the first internal reference voltage;
   a second regulator configured to generate a second internal reference voltage;
   wherein the first regulator and the second regulator each comprise:
   a differential circuit configured to generate a comparison signal corresponding to a voltage difference between a prescribed reference voltage and a control voltage correlated to one of the first internal reference voltage and the second internal reference voltage;
   a first current source supplying current to the differential circuit;
   a first current mirror circuit connected to first and second differential output lines, each connected to the differential circuit;
   a first transistor that controls the one of the first internal reference voltage and the second internal reference voltage based on the comparison signal;
   a first capacitor;
   a second transistor configured to control current flowing between the first differential output line and the first capacitor; and
   a second current source supplying current to the second transistor.

2. The DC-DC converter according to claim 1, wherein the first regulator and the second regulator each further comprise:
   a voltage dividing circuit configured to generate a divided voltage from the one of the first internal reference voltage and the second internal reference voltage, and the divided voltage is input into a gate of the second transistor.

3. The DC-DC converter according to claim 1, wherein the first regulator and the second regulator each further comprise a third current source for supplying current to the second differential output line.

4. The DC-DC converter according to claim 3, wherein the first regulator and the second regulator each further comprise a third transistor connected to the third current source, the third transistor configured to set a voltage output of the third current source to be constant.

5. The DC-DC converter according to claim 4, wherein the first regulator and the second regulator each further comprise a second capacitor having a first end connected to an output end of the third current source and a second end connected to a gate of the second transistor.

6. The DC-DC converter according to claim 5, wherein a capacitance of the second capacitor is smaller than a capacitance of the first capacitor by two orders of magnitude or more.

7. The DC-DC converter according to claim 1, wherein the first regulator and the second regulator each further comprise a second capacitor that is connected to a line for outputting the one of the first internal reference voltage and the second internal reference voltage, and the second capacitor is a ceramic capacitor.

8. The DC-DC converter according to claim 1, wherein the first regulator and the second regulator each further comprise:
   a second current mirror connected to the first and the second differential output lines at a point between the differential circuit and the first current mirror circuit,
   wherein the second transistor is connected to the first differential output line between the first current mirror circuit and the second current mirror circuit.

9. The DC-DC converter according to claim 1, wherein the first regulator and the second regulator each further comprise:
   a phase compensating circuit connected at a first end to the first power supply voltage or the second power supply voltage and at a second end to a gate or a base of the first transistor.

10. The DC-DC converter according to claim 1, wherein the first transistor and the first current mirror circuit of the second regulator are connected to a first line for supplying the power supply voltage, and a second capacitor is connected to a second line for supplying the power supply voltage.

11. A DC-DC converter, comprising:
    a first input voltage source;
    a first regulator connected to the first input voltage source and configured to generate a first internal reference voltage, which is supplied to a high-side driver circuit;
    a second regulator connected to the first input voltage source and configured to generate a second internal reference voltage, which is a supplied to a low-side driver circuit;
    a high-side switch connected to the first input voltage source and a first terminal of an inductor;
    a low-side switch connected to a ground potential line and the first terminal of the inductor;
    a capacitor connected to a second terminal of the inductor;
    wherein an output voltage is output at the second terminal of the inductor, and
    the first regulator and the second regulator each comprise:
    a differential circuit configured to generate a comparison signal corresponding to a voltage difference between a prescribed reference voltage and a control voltage correlated to one of the first internal reference voltage and the second internal reference voltage;
a first current source supplying current to the differential circuit;
a first current mirror circuit connected to the first and second differential output lines, each connected to the differential circuit;
a first transistor that controls the one of the first internal reference voltage and the second internal reference voltage based on the comparison signal;
a first capacitor;
a second transistor configured to control current flowing between the first differential output line and the first capacitor; and
a second current source supplying current to the second transistor.

12. The DC-DC converter according to claim 11, further comprising a second input voltage source connected to the first input voltage source and the first regulator, wherein a negative voltage is supplied to the first regulator.

13. The DC-DC converter according to claim 11, further comprising a second input voltage source connected to the first input voltage source and the second regulator, wherein a negative voltage is supplied to the second regulator.

* * * * *